(12) United States Patent
Papamoschou

(10) Patent No.: US 6,666,016 B2
(45) Date of Patent: Dec. 23, 2003

(54) MIXING ENHANCEMENT USING AXIAL FLOW

(75) Inventor: Dimitri Papamoschou, Mission Viejo, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 09/240,555

(22) Filed: Jan. 31, 1999

(65) Prior Publication Data
US 2002/0066268 A1 Jun. 6, 2002

(51) Int. Cl.[7] .............................. F02K 3/02; F23D 14/62
(52) U.S. Cl. ........................... 60/226.1; 60/204; 239/8; 239/418; 239/419.5
(58) Field of Search ............................... 60/226.1, 269, 60/231, 204; 239/418, 419.5, 423, 434.5, 8, 589

(56) References Cited

U.S. PATENT DOCUMENTS

| | | | |
|---|---|---|---|
| 3,996,738 A | 12/1976 | Justus | 60/39.16 |
| 4,280,969 A | 7/1981 | Swanson | 261/62 |
| 4,474,001 A * | 10/1984 | Griffin et al. | 60/226.1 X |
| 5,083,429 A | 1/1992 | Veres et al. | 60/325 |
| 5,123,242 A * | 6/1992 | Miller | 60/226.1 |
| 5,573,682 A | 11/1996 | Beason, Jr. et al. | 219/121.5 |
| 5,590,520 A | 1/1997 | Papamoschou | |
| 5,681,661 A | 10/1997 | Kelly | 428/601 |
| 6,094,907 A * | 8/2000 | Blackner | 60/226.1 |

FOREIGN PATENT DOCUMENTS

| | | |
|---|---|---|
| DE | 1 557 033 | 7/1970 |
| DE | 31 06 962 A1 | 9/1982 |
| DE | 31 48 756 A1 | 7/1983 |
| DE | 35 02 673 A1 | 7/1986 |
| EP | 0 157 691 A1 | 10/1985 |
| EP | 0 477 845 A1 | 4/1992 |
| EP | 0 477 846 A1 | 4/1992 |

OTHER PUBLICATIONS

Liepmann et al, "Elements of Gasdynamics", Galcit Aeronautical Series, Wiley and Sons, Inc., May 1967, p. 127.*
Shames, "Mechanics of Fluids", McGraw–Hill Book Company, 1982, p. 474.*
Dimitri Papamoschou, "Mach Wave Elimination in Supersonic Jets," 35th Aerospace Sciences Meeting & Exhibit, Jan. 6–10, 1997, Reno, NV.

* cited by examiner

Primary Examiner—Charles G. Freay
(74) Attorney, Agent, or Firm—Blakely, Sokoloff, Taylor & Zafman

(57) ABSTRACT

A method and an apparatus for enhancing fluid mixing. The method comprises the following: (a) configuring a duct to have an effective outer wall, an effective inner wall, a cross-sectional shape, a first cross-sectional area and an exit area, the first cross-sectional area and the exit area being different in size; (b) generating a first flow at the first cross-sectional area, the first flow having a total pressure and a speed equal to or greater than a local speed of sound; and (c) generating a positive streamwise pressure gradient in a second flow in proximity of the exit area. The second flow results from the first flow. Fluid mixing is enhanced downstream from the duct exit area.

31 Claims, 19 Drawing Sheets

START

INTERMEDIATE

END

MIXING ENHANCEMENT USING AXIAL FLOW

This invention was made with Government support under Grant No. NAG-1-1729, awarded by NASA. The Government has certain rights in this invention.

BACKGROUND OF THE INVENTION

1. Field of the Invention

The present invention relates generally to mixing enhancement between two or more fluids, at least one of the fluids being a gas supplied under pressure. More particularly, it relates to mixing enhancement in fuel injectors, sprays, chemical lasers, inside the exhaust duct of turbine engines, outside the exhaust duct of jet engines, and other related applications.

2. Description of Related Art

Mixing enhancement is desirable in a large variety of processes and devices, including combustion, propulsion, fluid pumping, chemical lasers, materials processing, and spray coating.

In every combustion system, fuel and oxidizer must be mixed thoroughly and in the correct proportion before reaction takes place. Otherwise, combustion is incomplete, leading to reduced efficiency and excessive production of pollutants. Complete mixing is often difficult because of the limited space and/or time available for the reactants to mix thoroughly. This difficulty is augmented in cases when the velocity of the flow inside the combustion chamber is high subsonic (e.g., Mach number M≅0.8), sonic (M=1), or supersonic (M>1), because mixing is suppressed with increasing Mach number.

To overcome the above difficulty in large-scale combustion systems, prior art mixing enhancement devices such as swirlers, ramps, and lobe mixers are incorporated in injectors for fuel and/or oxidizer. However, these mechanical mixers decrease the momentum of the flow, thus compromise the penetration of the reactants into the combustion zone. Penetration, which is proportional to the fluid momentum, is crucial in many combustion schemes. Because mechanical mixers increase the fluid resistance of the injector, higher pumping power must be used to deliver the same amount of reactant. Furthermore, mechanical mixers cause total pressure losses which in turn cause decreased system efficiency and, in propulsion devices, loss of thrust.

In small-scale combustion applications, such as in a piston cylinder of a diesel engine, mechanical mixers would be very costly to install and maintain because of their complex shapes.

Therefore, there is a current need for a simple and efficient mixing enhancement scheme which is easy to implement and maintain for use in both large-scale and small-scale combustion applications.

In jet propulsion systems, it is often required to reduce jet noise by enhancing fluid mixing between the jet exhaust and the ambient air or, in the case of certain turbofan engines, by enhancing mixing between the core stream and the fan stream inside the exhaust duct. The same mixing also reduces the thermal signature of the jet exhaust. The typical device used for mixing inside or at the exit of the exhaust of the engine is the lobe mixer. Although lobe mixers can provide adequate mixing, they reduce thrust and increase the weight and complexity of the engine. The thrust reduction is particularly severe when the engine exhaust is supersonic.

Therefore, there is a current need for a simple, lightweight and efficient mixing enhancement scheme which is easy to implement and maintain for use in jet propulsion systems.

Performance of ejectors depends on the rapidity of mixing between the motive fluid and the fluid entrained into the ejector. In aircraft engines, where ejectors are often used for noise reduction, mixing enhancement between the engine exhaust (which acts as the motive fluid) and the ambient air entrained into the ejector is accomplished typically via lobe mixers. As discussed above, lobe mixers penalize engine performance.

In industrial fluid pumping applications, ejectors rarely employ mechanical mixers, relying instead on the natural mixing between motive and entrained fluids. Mechanical mixers are avoided because they would increase the complexity, manufacturing costs, and maintenance expenses of the pump. Thus, there is a current need for an effective mixing enhancement scheme which is geometrically simple and easy to implement for use in ejector pumps.

Therefore, there is a current need for a simple and efficient mixing enhancement scheme which is easy to implement and maintain for use in ejectors.

The efficiency of chemical lasers depends on the completeness of mixing between the reactant gases used for lasing. Each of the reactant gases enters the laser cavity via an injector. Since the gases enter at supersonic speeds, mixing is very slow. Enhancing the mixing of gases in this case with installation of a mechanical mixer on each injector is impractical due to the large number of injectors.

Therefore, there is a current need for an effective mixing enhancement scheme having simple geometric shapes to improve performance of chemical lasers.

In several materials processing schemes, a molten metal is atomized into spray droplets by the action of a pressurized gaseous jet, then deposited on a surface according to a specified pattern. Mixing enhancement of the gaseous jet facilitates the atomization process. Mixing enhancement is also needed in a variety of spray coating applications, where fine atomization of the coating liquid enables homogeneous deposition. Because the dimensions of jet nozzles used in spray depositions are very small, installation of mechanical mixers is impractical.

Therefore, there is a current need for a simple and efficient mixing enhancement scheme which is easy to implement and maintain for use in spray deposition devices.

SUMMARY OF THE INVENTION

The present invention is a method and an apparatus for enhancing fluid mixing. The method comprises the following: (a) configuring a duct to have an effective outer wall, an effective inner wall, a cross-sectional shape, a first cross-sectional area and an exit area, the first cross-sectional area and the exit area being different in size; (b) generating a first flow at the first cross-sectional area, the first flow having a total pressure and a speed equal to or greater than a local speed of sound; and (c) generating a positive streamwise pressure gradient in a second flow in proximity of the exit area. The second flow results from the first flow. Fluid mixing is enhanced downstream from the duct exit area.

DESCRIPTION OF THE INVENTION

In the following description, for purposes of explanation, numerous details are set forth in order to provide a thorough understanding of the present invention. However, it will be apparent to one skilled in the art that these specific details are not required in order to practice the present invention.

The present invention is a method and a system for fluid mixing enhancement. The system employs simple and compact geometric shapes, and is applicable to high-speed flows, where mixing enhancement is most difficult to achieve. The system of the present invention uses injection of an axial flow to destabilize, at a desired location, the axial flow itself and/or a fluid stream adjacent to the axial flow.

The present invention can be practiced in two modes. In the first mode, the present invention generates an appropriate flow to enhance mixing of fluid in a fluid stream which is surrounded by the flow or is adjacent to the flow. The flow is also called the coflow. In the second mode, the present invention generates a flow at certain predetermined conditions to induce self-excitation and fluid mixing. In the second mode, there is no separate fluid stream, just the flow acting as both the coflow and the fluid stream. Both modes arise from the same fluid dynamics phenomenon.

The system of the present invention comprises a duct and a flow generator. A duct configured according to the method of the present invention can have various shapes. To facilitate the description of the present invention, several duct shapes will be discussed in detail. It is noted that the present invention is not limited to these duct shapes.

Figure 1:
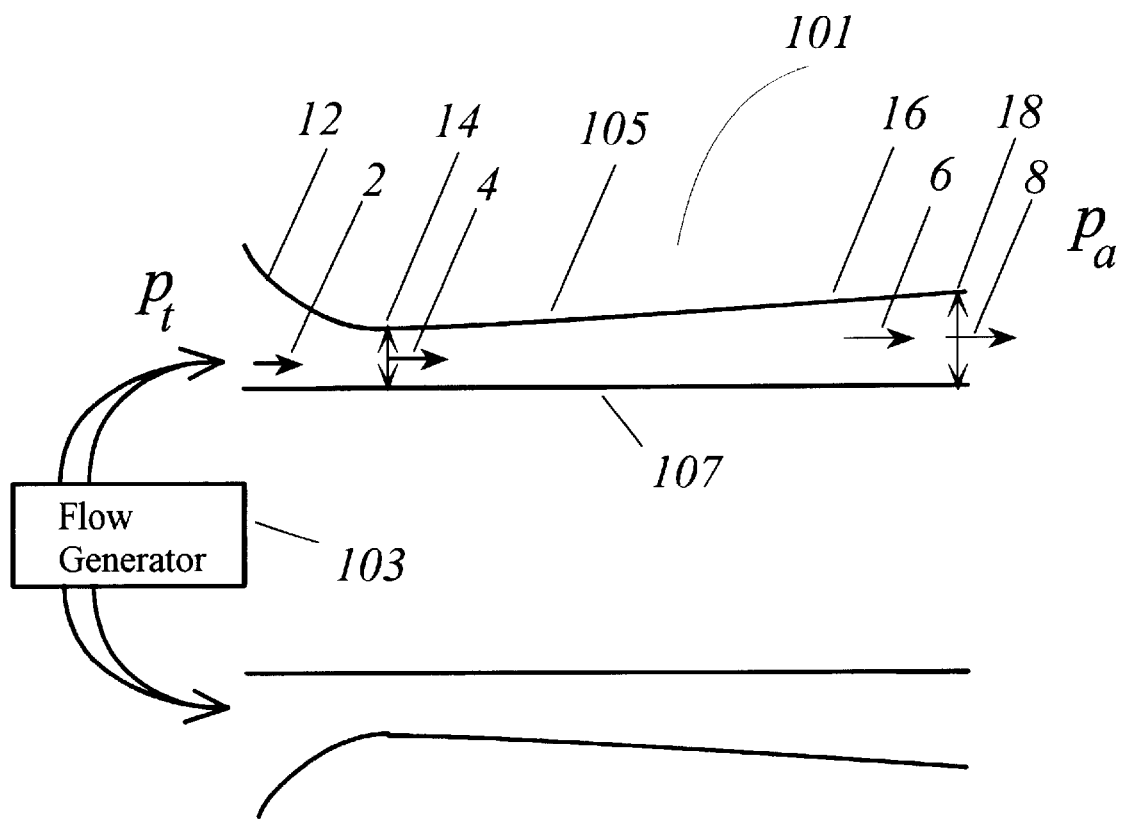
FIG. 1 illustrates a first embodiment of the present invention.

FIG. 1 illustrates a first embodiment of the present invention. FIG. 1 shows an exemplary converging-diverging duct 101. From area 12 to area 14, the duct 101 is converging. From area 14 to area 18, the duct 101 is diverging.

The duct 101 comprises an effective outer wall 105, an effective inner wall 107, a cross sectional area $A_1$ at area 14, and an exit area $A_e$ at area 18. The cross sectional area $A_1$ and the exit area $A_e$ are different in size.

As shown in FIG. 1, the converging-diverging feature of the duct 101 is caused by the shape of the effective outer wall 105. Equivalently, this feature can also be caused by the shape of the effective inner wall 107, or by both effective walls.

The effective walls 105, 107 can be either rigid or fluid. For example, the effective inner wall can be formed by a centerbody, or by an outer wall of a fluid stream nozzle. In such cases, the effective inner wall is rigid. The effective inner wall can also be formed by a boundary of a fluid stream, in which case, it is fluid. A portion of either one or both of the effective walls can be formed by a transversal flow which shapes that portion of the effective wall. A transversal flow is defined as an external flow which is injected at an angle or normal to the flow inside the duct.

Figure 2A:
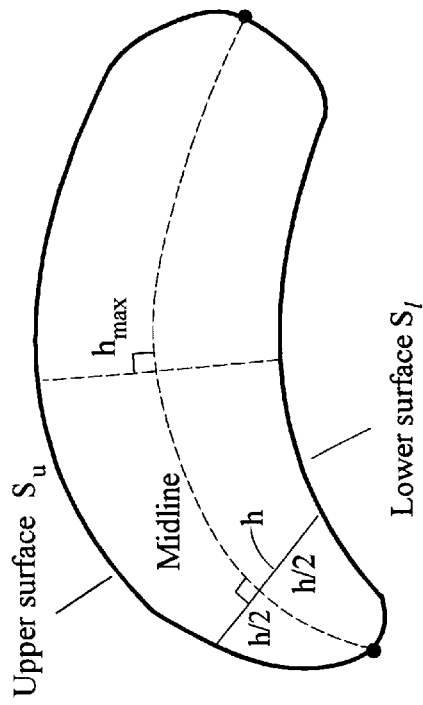
FIGS. 2A and 2B illustrate different cross-sectional shapes of the duct of the present invention.

The cross-sectional shape of the duct 101 can be annular or oblong. If it is annular as shown in FIG. 2A, then the effective outer wall 105 corresponds to the outer surface $S_o$ and the effective inner wall 107 corresponds to the inner surface $S_i$.

Figure 2B:
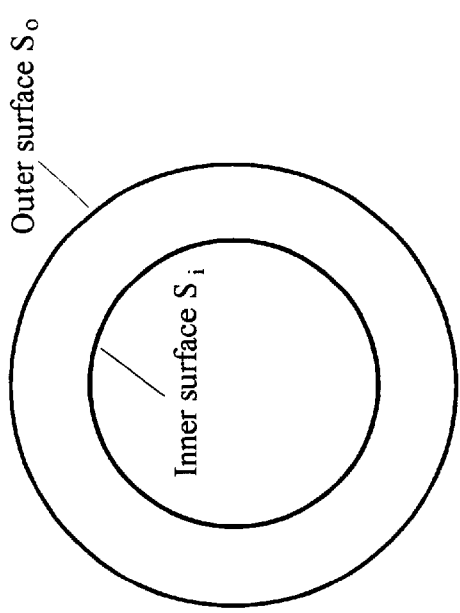

If the cross-sectional shape of the duct 101 is oblong as shown in FIG. 2B, then the effective outer wall 105 corresponds to the upper surface $S_u$ and the effective inner wall 107 corresponds to the lower surface $S_l$. In the case where the cross-sectional shape of the duct 101 is oblong, FIG. 1 represents the longitudinal sectional view of either one oblong duct 101, or at least two different oblong ducts. If FIG. 1 represents the longitudinal sectional view of one oblong duct 101, then the midline of the cross-sectional area of the oblong duct 101 has an angle greater than 180 degrees. If FIG. 1 represents the longitudinal sectional view of at least two different oblong ducts, then the lower part of FIG. 1 represents a different oblong duct, oppositely located from the duct 101.

For the case where the lower part of FIG. 1 represents a different oblong duct, then the same flow generator 103 or a different flow generator can be used to generate a flow in the lower duct. The configuration of the lower duct and the generated flow in the lower duct satisfy the same conditions for mixing enhancement as the upper duct.

Referring to FIG. 2B, the midline divides the cross-sectional shape into the upper surface $S_u$ and the lower surface $S_l$. The midline is defined as the line of maximum length which is equidistant from the upper surface $S_u$ and the lower surface $S_l$. The distance used in determining the equidistant property is measured along a line normal to the midline. The lines h and $h_{max}$ are examples of such a distance. Hereinafter, the oblong shape is defined as a shape which satisfies the relation $L/h_{max} \geq 1.5$ where L is the length of the midline and $h_{max}$ is the maximum height of the shape.

In the present invention, the duct exit area $A_e$ is defined as a duct cross-sectional area which includes the duct location at which a flow inside the duct has first contact with an ambient or with a fluid stream.

Figure 2D:
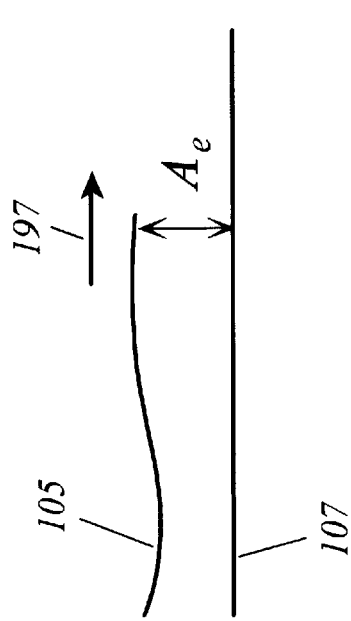
FIGS. 2C and 2D relate to the definition of the exit area of the duct.
Figure 2C:
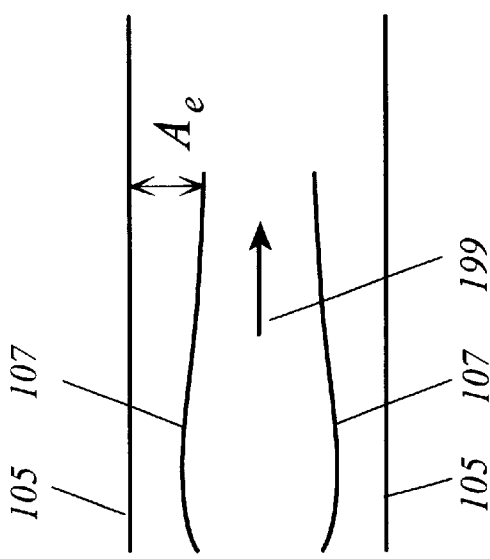

Referring to FIG. 2C, if the duct 101 of FIG. 1 is annular (as shown in FIG. 2A) and the effective inner wall 107 recesses from the effective outer wall 105, then the exit area $A_e$ is as shown in FIG. 2C. This exit area $A_e$, which lies in the plane normal to both the effective inner and outer walls, contains the location on the effective inner wall 107 at which the duct flow has first contact with a fluid stream 199.

Referring to FIG. 2D, if the duct 101 of FIG. 1 is oblong (as shown in FIG. 2A) and the effective inner wall 107 protrudes past the effective outer wall 105, then the exit area $A_e$ is as shown in FIG. 2D. This exit area $A_e$, which lies in the plane normal to both the effective inner and outer walls, contains the location on the effective outer wall 105 at which the duct flow has first contact with an ambient fluid 197.

The above definition and discussion of the duct exit area apply throughout the description of the present invention.

Referring to FIG. 1, the flow generator 103 generates a flow 2 near the converging area 12. The flow 2 is subsonic, i.e., it has a velocity smaller than the local speed of sound. The flow generator 103 pressurizes the subsonic flow 2. Due to the configuration of the duct 101 and the pressure provided by the flow generator 103, the subsonic flow 2 is accelerated toward area 14. When the subsonic flow 2 reaches area 14, it results in a sonic flow 4. Flow 4 is sonic, i.e., it has a velocity equal to the local speed of sound.

The sonic flow 4 is accelerated towards the exit area 18, resulting in flow 6 near the diverging area 16, and in flow 8 at the exit area 18. Flow 8 is exhausted into the ambient. Flow 6 is subjected to a positive streamwise pressure gradient at area 16. Area 16 is in the proximity of the exit area 18. The configuration of the duct 101, the sonic flow 4 at area 14, and the positive streamwise pressure gradient at area 16 facilitate enhancement of fluid mixing downstream from the exit area 18.

For the mixing enhancement to occur for the system of FIG. 1, the total pressure $p_t$ of flow 4, defined as the pressure at which the flow is supplied from a reservoir must be between two thresholds. The reservoir used in the definition can be either real or virtual, and is included in the flow generator 103. The lower threshold is equal to $\alpha^* p_a$, where $p_a$ is the ambient static pressure and $\alpha$ is a number greater than 1. The upper threshold is equal to $\beta^* p_a$, where $\beta$ is a number greater than $\alpha$. It is noted that, if the total pressure $p_t$ is very close to the ambient static pressure $p_a$, i.e., if the pressure difference across the duct is very small, there is only a subsonic flow (i.e., the Mach number M of the flow is strictly less than 1) in the duct 101, and there is no mixing enhancement downstream from the exit area 18.

Figure 3A:
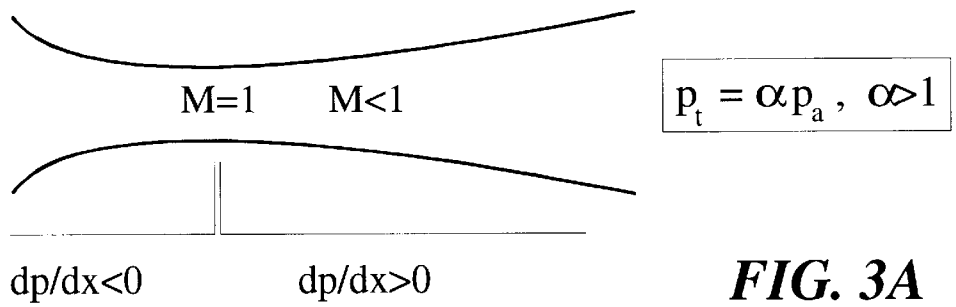
FIGS. 3A, 3B, and 3C illustrate the range of the total pressure $p_t$ for which fluid mixing enhancement occurs for the system of FIG. 1.
Figure 3B:
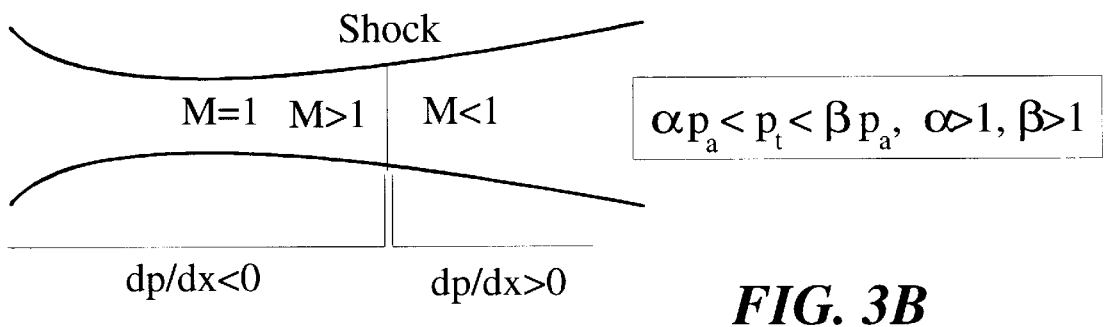
Figure 3C:
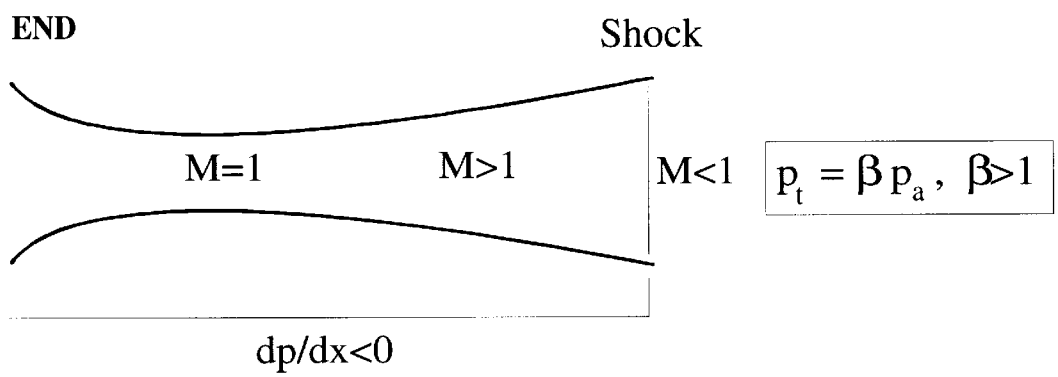

FIGS. 3A, 3B, and 3C illustrate the range of the total pressure $p_t$ for which fluid mixing enhancement occurs for the system of FIG. 1, downstream from the exit area 18.

FIG. 3A illustrates the case of $p_t$ equal to the lower threshold which is the critical value $\alpha^* p_a$. Referring to FIG. 3A, when $p_t$ is equal to the critical value $\alpha^* p_a$, a sonic flow, i.e., a flow having Mach number M equal to 1, first appears at the minimum area $A_{min}$ of the duct. Downstream from the minimum area $A_{min}$, the flow decelerates back to a subsonic speed (i.e., Mach number M<1). The critical value $\alpha^* p_a$ depends on the area ratio $A_e/A_{min}$ where $A_e$ is the size of exit area and $A_{min}$ is the size of the minimum area. Upstream from this minimum area $A_{min}$, the streamwise pressure gradient dp/dx is negative. Downstream from this minimum area, the streamwise pressure gradient dp/dx is positive. The mixing enhancement downstream from the duct exit area starts occurring at this critical value $p_t = \alpha^* p_a$.

FIG. 3B illustrates the case of $p_t$ having a value greater than the critical value $\alpha^* p_a$ but smaller than the upper threshold $\beta^* p_a$. Referring to FIG. 3B, a sonic flow (i.e., M=1) occurs at $A_{min}$ and immediately results in a supersonic flow (i.e., M>1) for a short length until a shock occurs which renders the flow subsonic (i.e., M<1). The subsonic flow further decelerates in the remaining part of the duct. Upstream from the area where the shock occurs, the streamwise pressure gradient dp/dx is negative. Downstream from this area, the streamwise pressure gradient dp/dx is positive. As the value of $p_t$ is increased to be closer to the upper threshold $\beta^* p_a$, the shock moves toward the exit area. Mixing enhancement occurs for this range of values of $p_t$.

FIG. 3C illustrates the case of $p_t$ equal to the upper threshold $\beta^* p_a$. At this value of $p_t$, the shock is located at the duct exit area. Downstream from the minimum area $A_{min}$, the flow is supersonic (i.e., M>1). The streamwise pressure gradient dp/dx is negative throughout the inside of the duct. Mixing enhancement ceases for $p_t$ equal to or greater than this upper threshold $\beta^* p_a$.

Figure 4:
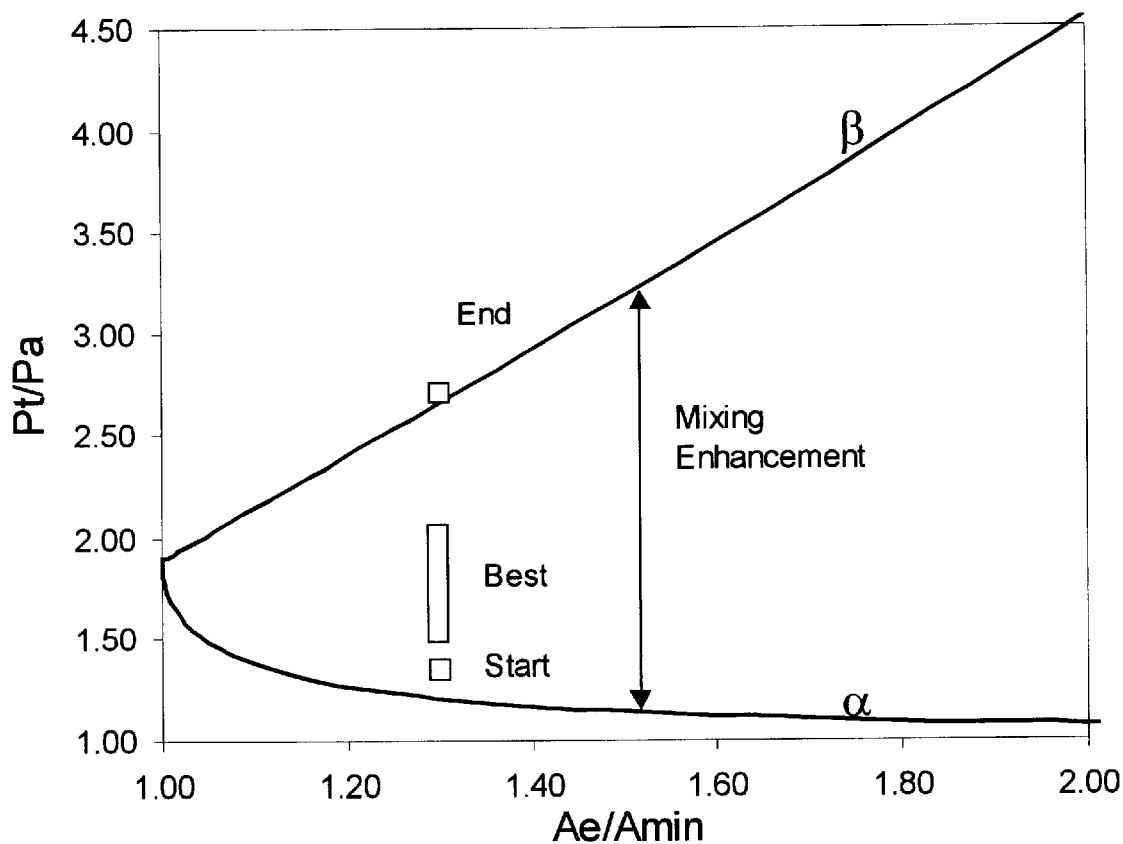
FIG. 4 is a graph illustrating the operating range of the pressure ratio $p_t/p_a$ for mixing enhancement as a function of the area size ratio $A_e/A_{min}$.

FIG. 4 is a graph illustrating the operating range of the pressure ratio $p_t/p_a$ for mixing enhancement as a function of the area size ratio $A_e/M_{min}$. Referring to FIG. 4, the upper curve represents $\beta$, and the lower curve represents $\alpha$. Mixing enhancement occurs for values of pressure ratio $p_t/p_a$ which are between the two curves. The two curves are calculated using established techniques for inviscid one-dimensional flow and for separated nozzle flow. The graph of FIG. 4 also includes some points (marked as "start", "best, and "end") obtained from laboratory experimental results. These experimental results verify the theoretical derivations of the two curves $\alpha$ and $\beta$.

Figure 5:
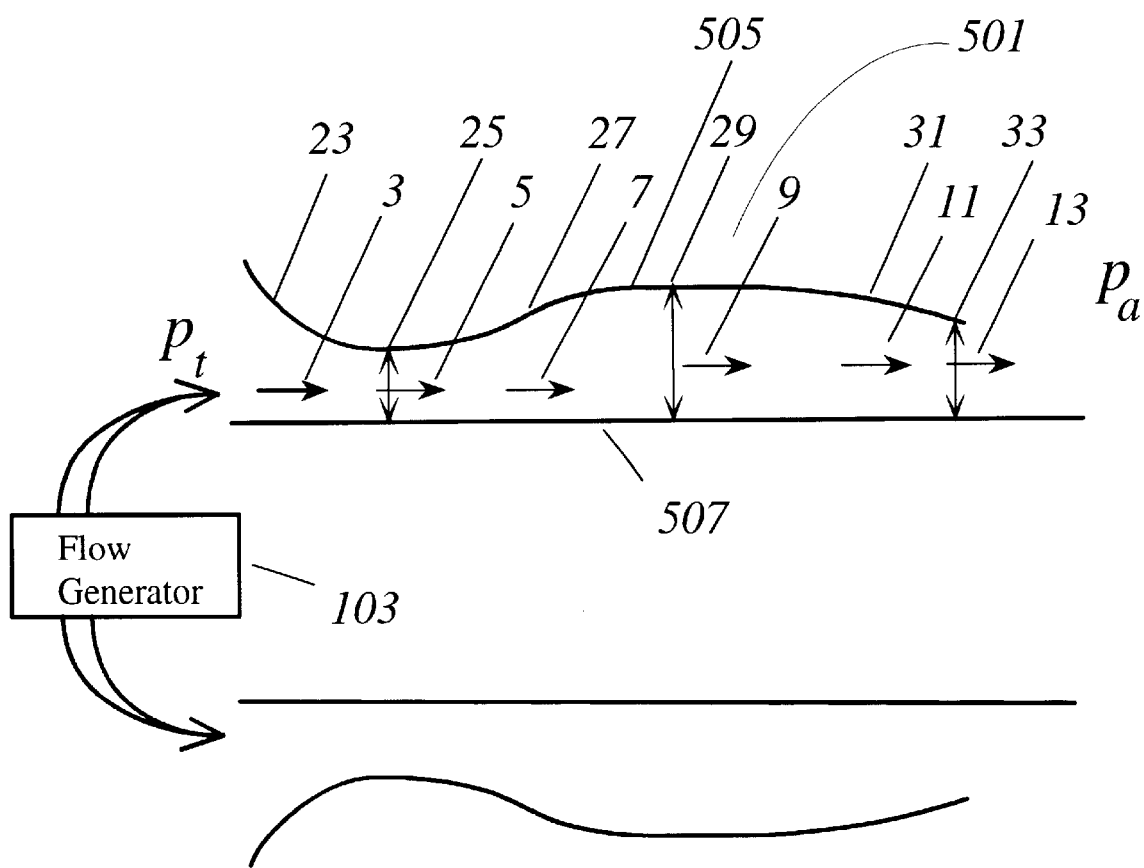
FIG. 5 illustrates a second embodiment of the present invention.

FIG. 5 illustrates a second embodiment of the present invention. FIG. 5 shows a longitudinal sectional view of an exemplary converging-diverging-converging duct 501. From area 23 to area 25, the duct 501 is converging. From area 25 to area 29, the duct 501 is diverging. From area 29 to area 33, the duct 501 is converging.

The duct 501 comprises an effective outer wall 505, an effective inner wall 507, a cross sectional area $A_{min}$ at area 29, a maximum area $A_{max}$ at area 29 and an exit area $A_e$ at area 33. The cross sectional area $A_{min}$ and the exit area $A_e$ are different in size.

As shown in FIG. 5, the converging-diverging-converging feature of the duct 501 is caused by the shape of the effective outer wall 505. Equivalently, this feature can also be caused by the shape of the effective inner wall 507, or by both effective walls.

The effective walls 505, 507 can be either rigid or fluid. For example, the effective inner wall 507 can be formed by a centerbody, or by an outer wall of a jet nozzle. In such cases, the effective inner wall 507 is rigid. The effective inner wall 507 can also be formed by a boundary of a fluid stream, in which case, it is fluid. A portion of either one of the effective walls 505, 507 can be formed by a transversal flow which shapes that portion of that effective wall to satisfy the conditions for mixing enhancement.

The cross-sectional shape of the duct 501 can be annular or oblong. If it is annular as shown in FIG. 2A, then the outer surface $S_o$ represents the effective outer wall 505 and the inner surface $S_1$ represents the effective inner wall 507.

If the cross-sectional shape of the duct 501 is oblong as shown in FIG. 2B, then the upper surface $S_u$ represents the effective outer wall 505 and the lower surface $S_1$ represents the effective inner wall 507.

In the case where the cross-sectional shape of the duct 501 is oblong, FIG. 5 represents the longitudinal sectional view of either one oblong duct 501, or at least two different oblong ducts. If FIG. 5 represents the longitudinal sectional view of one oblong duct 501, then the midline of the cross-sectional area of the oblong duct 501 has an angle greater than 180 degrees. If FIG. 5 represents the longitudinal sectional view of at least two different oblong ducts, then the lower part of FIG. 5 represents a different oblong duct, oppositely located from the duct 501.

For the case where the lower part of FIG. 5 represents a different oblong duct, the same flow generator 103 or a different flow generator can be used to generate a flow in the lower duct. The configuration of the lower duct and the generated flow in the lower duct satisfy the same conditions for mixing enhancement as the upper duct and the upper duct flow, but do not have to be identical to the configuration of the upper duct and the upper duct flow, respectively.

Referring to FIG. 5, the flow generator 103 generates a subsonic flow 3 near the converging area 23. The flow generator 103 pressurizes the subsonic flow 3. Due to the configuration of the duct 501 and the pressure supplied by the flow generator 103, the subsonic flow 3 is accelerated toward area 25. When the subsonic flow 3 reaches area 25, it results in a sonic flow 5.

The sonic flow 5 is accelerated toward the diverging area 27, resulting in the accelerating flow 7 at the diverging area 26. Flow 7 is accelerated toward area 29 which is larger than area 26, resulting in a supersonic flow 9 at area 29. The supersonic flow 9 is accelerated toward the converging area 31, resulting in flow 11 at the converging area 31. Flow 11 is subjected to a positive streamwise pressure gradient at area 31. Flow 11 results in flow 13 at the exit area 33. Flow 13 is exhausted into the ambient. The configuration of the duct 501, the sonic flow 5 at area 25, and the positive streamwise pressure gradient in the flow 11 at area 31 facilitate enhancement of fluid mixing downstream from the exit area 33.

For the mixing enhancement to occur for the system of FIG. 5, the total pressure $p_t$ of flow 5, defined as the pressure at which the flow is supplied from a reservoir must be equal to or greater than a threshold. The reservoir used in the definition can be real or virtual, and included in the flow generator 103. The threshold is equal to the product of the ambient static pressure $p_a$ and a number $\gamma$ greater than 1. For the system of FIG. 5, mixing enhancement occurs for any $p_t$ value which is equal to or greater than this threshold. Since there is no upper limit on the total pressure $p_t$, the system of FIG. 5 can be used when the pressure ratio $p_t/p_a$ is in the range of moderate to high.

FIGS. 6A through 6D illustrate the range of the total pressure $p_t$ for which fluid mixing enhancement occurs for the system of FIG. 5, downstream from the exit area 33.

Figure 6A:
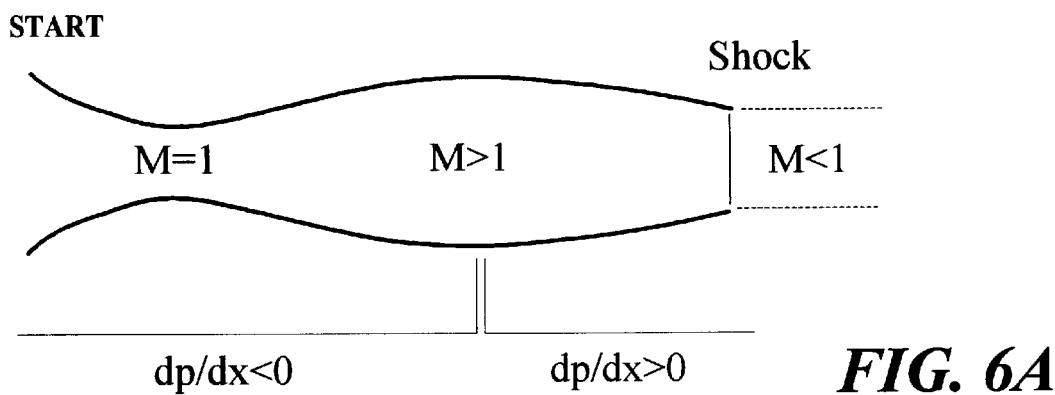
FIGS. 6A through 6D illustrate the range of the total pressure $p_t$ for which fluid mixing enhancement occurs for the system of FIG. 5.

Referring to FIG. 6A, for $p_t$ equal to the threshold $\gamma^*p_a$, a sonic flow (i.e., M=1) occurs at the minimum area of the duct, denoted as $A_{min}$, and results in a supersonic flow (i.e., M>1) for the remaining length of the duct until a shock occurs at the exit area $A_e$. This number $\gamma$ is primarily a function of the area size ratio $A_e/A_{min}$. For the system of FIG. 5, mixing enhancement starts occurring at $p_t$ equal to $\gamma^*p_a$ and occurs for all values of $p_t$ greater than $\gamma^*p_a$.

As shown in FIG. 6A, for $p_t=\gamma^*p_a$, downstream from the exit area, the flow is subsonic (i.e., M<1).

Figure 6B:
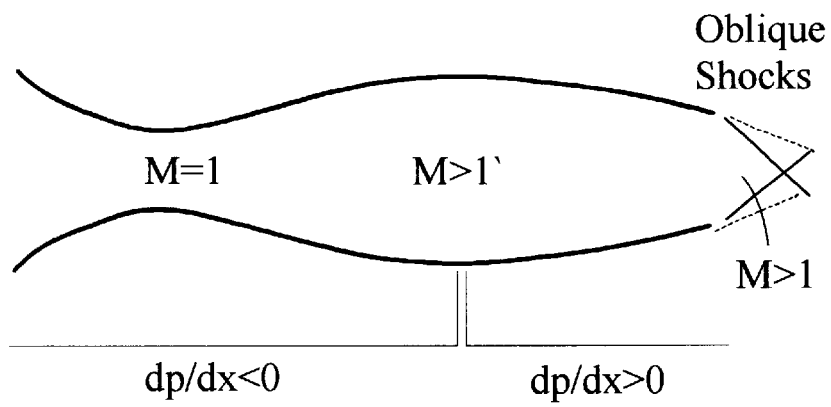

As shown in FIG. 6B, for $p_t$ moderately greater than $\gamma^*p_a$, oblique shocks (with Mach number M>1) are formed at the exit area.

Figure 6C:
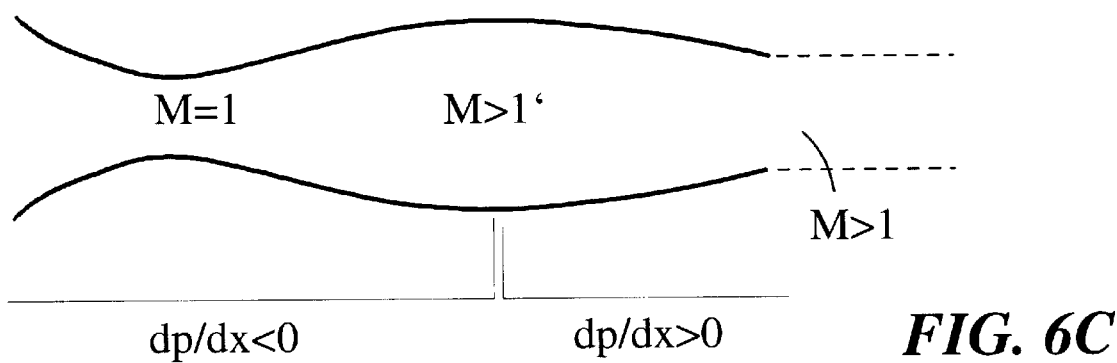
Figure 6D:
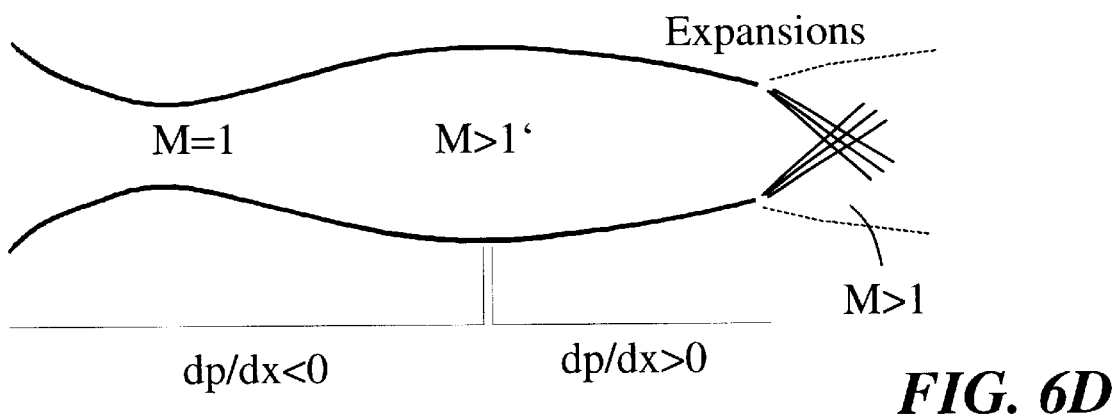

As shown in FIG. 6C, for $p_t$ equal to $\eta^*p_a$ which is a certain value greater than $\gamma^*p_a$, the flow emerges straight from the exit area without any shocks or expansions, with M>1 (this flow is also called the perfectly expanded jet).

As shown in FIG. 6C, for values of $p_t$ greater than $\eta^*p_a$, expansion waves (having M>1) occur immediately downstream from the duct exit area.

Regardless of the nature of the flow downstream from the duct area, inside the duct, the flow is still sonic (i.e., M=1) at the minimum area $A_{min}$ and supersonic (i.e., M>1) for the remaining length of the duct. Thus, for the system of FIG. 5, mixing enhancement occurs for all values of $p_t$ equal to or greater than $\gamma^*p_a$.

Figure 7:
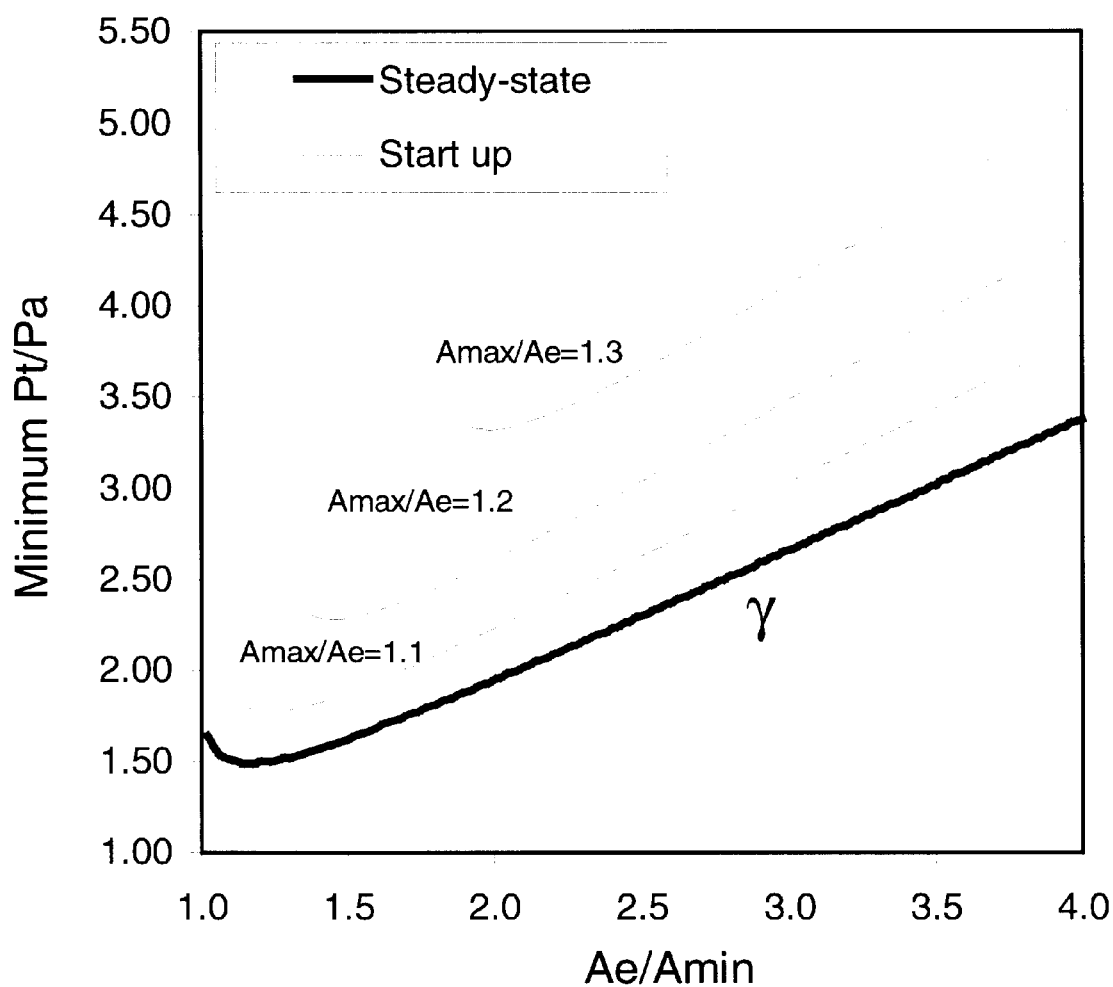
FIG. 7 is a graph illustrating the operating range of the pressure ratio $p_t/p_a$ for mixing enhancement as a function of the area size ratios $A_e/A_{min}$ and $A_{max}/A_e$, where $A_e$ is the exit area, $A_{min}$ is the minimum area, and $A_{max}$ is the maximum area of the converging-diverging-converging duct of FIG. 5.

FIG. 7 is a graph illustrating the operating range of the pressure ratio $p_t/p_a$ for mixing enhancement as a function of the area size ratios $A_e/A_{min}$ and $A_{max}/A_e$, where $A_e$ is the exit area, $A_{min}$ is the minimum area, and $A_{max}$ is the maximum area of the converging-diverging-converging duct 501.

Referring to FIG. 7, each of the curves represents the threshold $\gamma$ for a distinct value of $A_{max}/A_e$. For a particular value of $A_{min}/A_e$, mixing enhancement occurs for values of pressure ratio $p_t/p_a$ which are above the corresponding curve. There is no upper limit above which mixing enhancement ceases to occur. The curves are calculated using well-established methods for inviscid, one-dimensional flow. Pressure ratio for steady-state operation is indicated by the heavy line. During start up, the nozzle must be subjected to a higher pressure ratio, indicated by the thin lines for each $A_{max}/A_e$, to expel the shock formed at the maximum area $A_{max}$. The area ratio $A_e/A_{min}$ must be greater than the value at the beginning of each $A_{max}/A_e$ curve, unless a variable-area nozzle is used.

Figure 8:
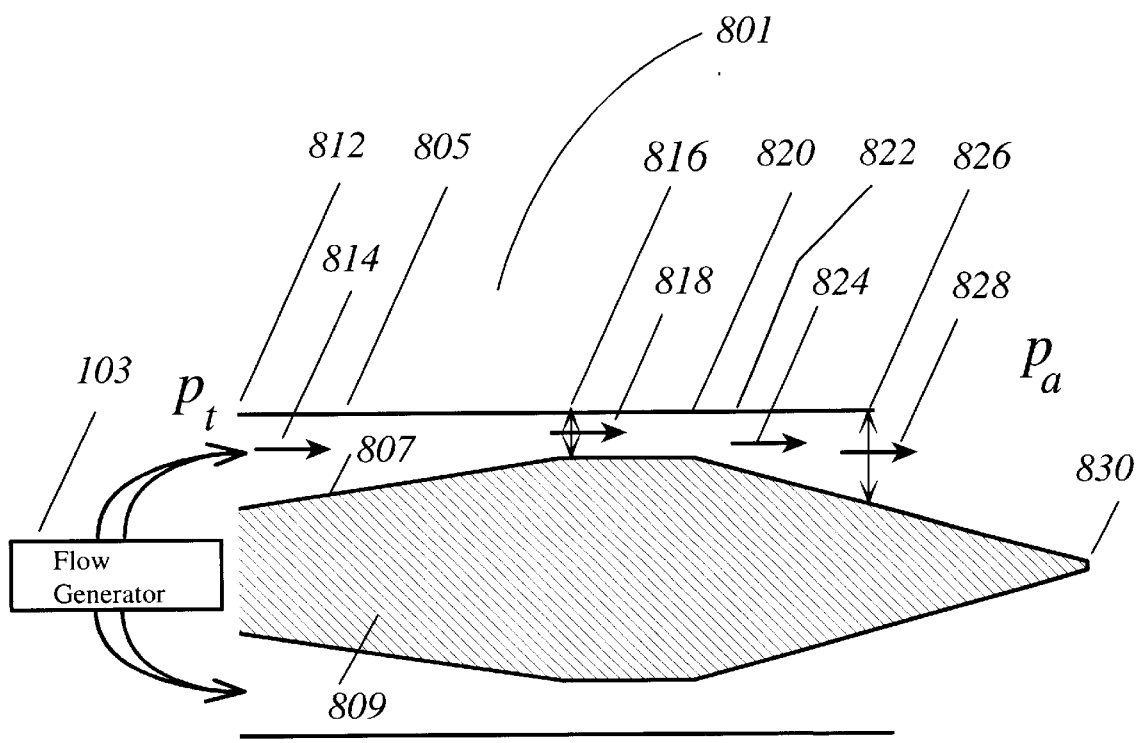
FIG. 8 is a third embodiment of the present invention.

FIG. 8 is a third embodiment of the present invention, which comprises a duct 801, a flow generator 103, and a centerbody 809. From area 812 to area 816, the duct 801 is converging. From area 816 to area 820, the duct 801 is shown as constant for illustrative purposes only, it can also be diverging. From area 820 to 826, the duct 801 is diverging.

Referring to FIG. 8, the duct 801 comprises an effective outer wall 805, an effective inner wall 807, a cross sectional area $A_{min}$ at area 816, and an exit area $A_e$ at area 826. The cross sectional area $A_{min}$ is smaller than the exit area $A_e$. The effective inner wall 807 is formed by the centerbody 809. Since the centerbody 809 extends past the exit area 828, the effective inner wall 807 is longer than the effective outer wall 805. The present invention does not require that the centerbody be extended past the exit area. The endpoint 830 of the centerbody 809 can also be coplanar with the duct exit area 826, or recessed from the termination of the duct effective outer wall 1205 (in which case, the duct exit area would be on the plane normal to the endpoint 830). The cross-sectional shape of duct 801 can be either annular or oblong.

Referring to FIG. 8, the flow generator 103 generates a subsonic flow 814 near the converging area 812. The flow generator 103 pressurizes the subsonic flow 814. Due to the configuration of the duct 801 and the pressure provided by the flow generator 103, the subsonic flow 814 is accelerated toward area 816. When the subsonic flow 814 reaches area 816, it results in a sonic flow 818.

The sonic flow 818 is accelerated toward the exit area 826, resulting in flow 824 at the diverging area 822, and in flow 828 at the exit area 826. Flow 828 is exhausted into the ambient. Flow 824 is subjected to a positive streamwise pressure gradient at area 822. The configuration of the duct 801, the sonic flow 818 at area 816, and the positive streamwise pressure gradient at area 822 facilitate enhancement of fluid mixing downstream from the exit area 828.

For the mixing enhancement to occur for the system of FIG. 8, the total pressure $p_t$ of sonic flow 818 must be between two thresholds. The lower threshold is equal to $\alpha^*p_a$, where $p_a$ is the ambient static pressure and $\alpha$ is a number greater than 1. The upper threshold is equal to $\beta^*p_a$, where $\beta$ is a number greater than $\alpha$. These two thresholds are the same as the ones discussed above for the system of FIG. 1. The discussions relating to FIGS. 3A, 3B, 3C and FIG. 4 also apply to the system of FIG. 8.

Figure 9:
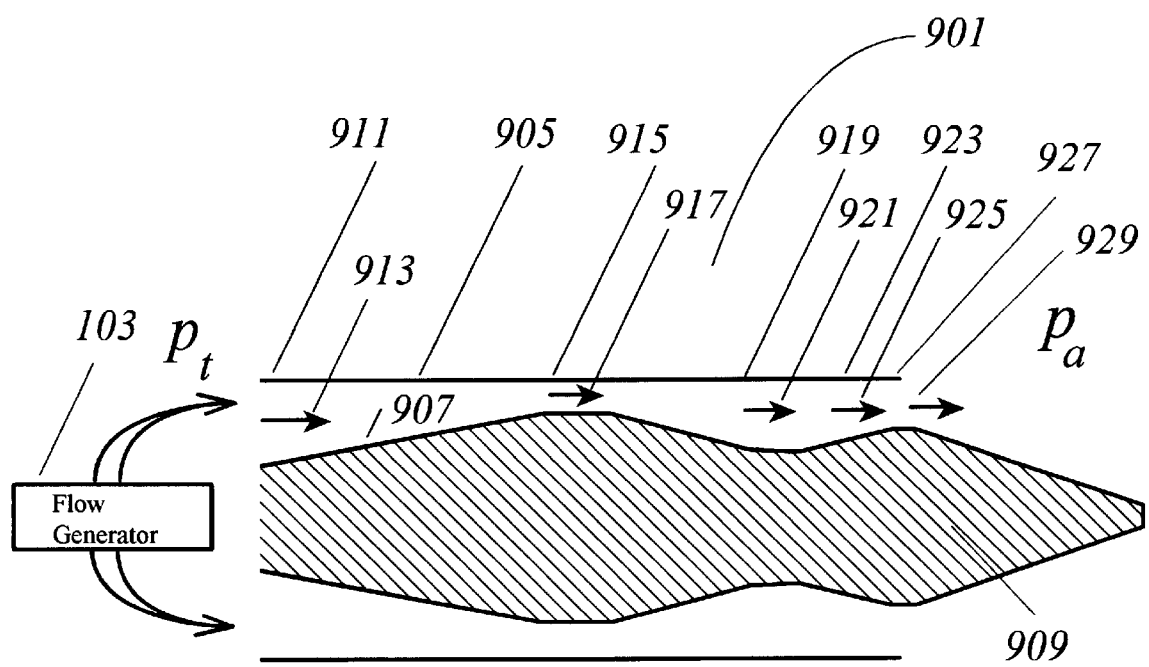
FIG. 9 illustrates a fourth embodiment of the present invention.

FIG. 9 illustrates a fourth embodiment of the present invention. FIG. 9 shows a longitudinal sectional view of a converging-diverging-converging duct 901. From area 911 to area 915, the duct 901 is converging. From area 915 to area 919, the duct 901 is diverging. From area 919 to area 927, the duct 901 is converging.

The duct 901 comprises an effective outer wall 905, an effective inner wall 907, a cross sectional area $A_{min}$ at area 915, a maximum area $A_{max}$ at area 919, and an exit area $A_e$ at area 927. The cross sectional area $A_{min}$ and the exit area $A_e$ are different in size.

As shown in FIG. 9, the converging-diverging-converging feature of the duct 901 is caused by the shape of the effective inner wall 907. The effective inner wall 907 is formed by the outer wall of a centerbody 909. The centerbody 909, also called a plug, does not have any fluid flowing though it. Since the centerbody 909 extends past the exit area 927, the effective inner wall 907 is longer the effective outer wall 905.

Referring to FIG. 9, the flow generator 103 generates a subsonic flow 913 near the converging area 911. The flow generator 103 pressurizes the subsonic flow 913. Due to the configuration of the duct 901 and the pressure supplied by the flow generator 103, the subsonic flow 913 is accelerated toward area 915. When the subsonic flow 913 reaches area 915, it results in a sonic flow 917.

The sonic flow 917 is accelerated toward the maximum area 919 which is larger than area 915, resulting in the supersonic flow 921 at the diverging area 919. From area 915 to area 919, the flow is supersonic. The supersonic flow 921 has maximum velocity. The supersonic flow 921 is decelerated toward the converging area 923, resulting in flow 925 at the converging area 923. Flow 925 is subjected to a positive streamwise pressure gradient at area 923. Flow 925 results in flow 929 at the exit area 927. Flow 929 is exhausted into the ambient. It is noted that the ambient defined as the fluid medium surrounding the duct 901 can be either motionless or in motion. An example of an ambient in motion is the ambient surrounding an engine exhaust of an airplane in flight.

The configuration of the duct 901, the sonic flow 917 at area 915, and the positive streamwise pressure gradient in the flow 925 at area 923 facilitate enhancement of fluid mixing downstream from the exit area 927.

For the mixing enhancement to occur for the system of FIG. 9, the total pressure $p_t$ of flow 917, defined as the pressure at which the flow is supplied from a reservoir, must be equal to or greater than a threshold. The reservoir used in the definition can be real or virtual, and included in the flow generator 103. The threshold is equal to the product of the ambient static pressure $p_a$ and a number $\gamma$ greater than 1. For the system of FIG. 9, mixing enhancement occurs for any $p_t$ value which is equal to or greater than this threshold. Since there is no upper limit on the total pressure $p_t$, the system of FIG. 9 can be used when the pressure ratio $p_t/p_a$ is in the range of moderate to high.

Figure 10:
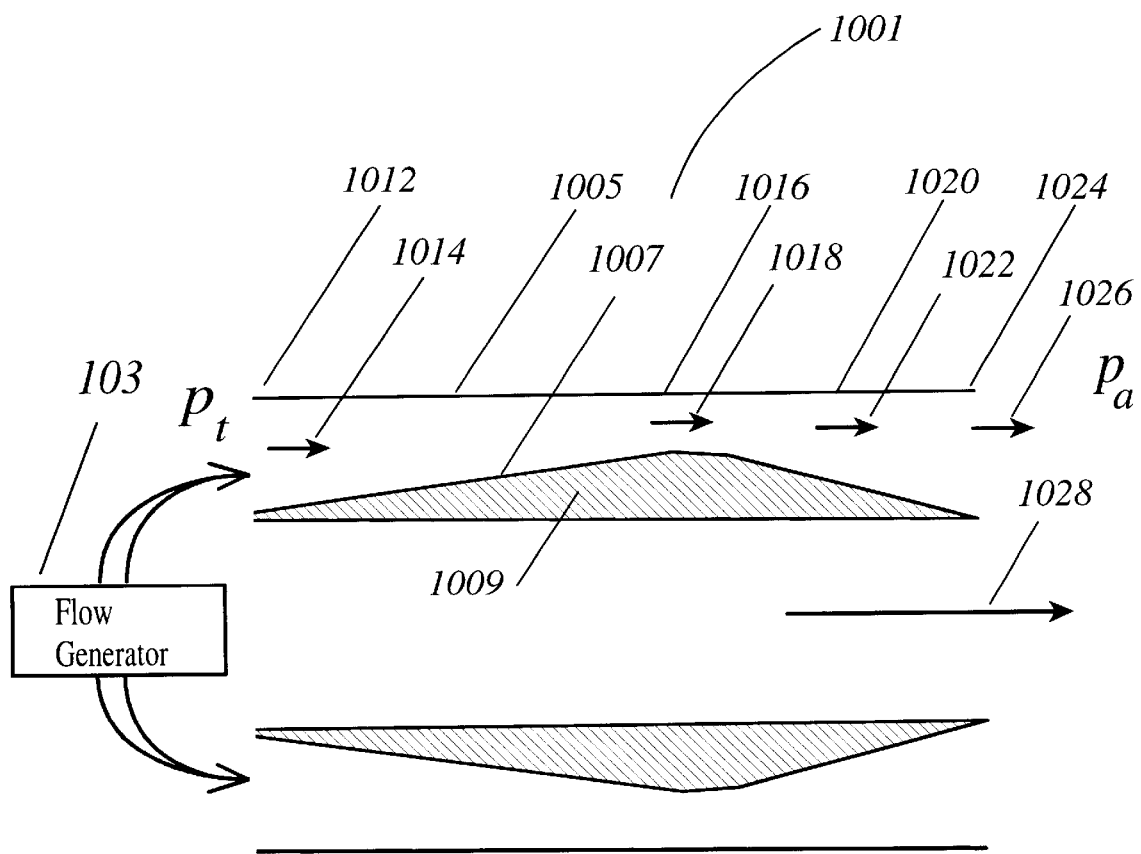
FIG. 10 is a fifth embodiment of the present invention.

FIG. 10 is a fifth embodiment of the present invention, which comprises a duct 1001, a flow generator 103, and a fluid stream nozzle 1009. From area 1012 to area 1016, the duct 1001 is converging. From area 1016 to 1024, the duct 1001 is diverging. The fluid stream nozzle 1009 has a fluid stream 1028 flowing through it. The fluid stream 1028 is also called the primary stream.

Referring to FIG. 10, the duct 1001 comprises an effective outer wall 1005, an effective inner wall 1007, a minimum cross sectional area $A_{min}$ at area 1016, and an exit area $A_e$ at area 1024. The minimum cross sectional area $A_{min}$ is smaller than the exit area $A_e$. The effective inner wall 1007 is formed by the outer wall of the fluid stream nozzle 1009. The cross-sectional shape of duct 1001 can be either annular or oblong.

Referring to FIG. 10, the flow generator 103 generates a subsonic flow 1014 near the converging area 1012. The flow generator 103 pressurizes the subsonic flow 1014. Due to the configuration of the duct 1001 and the pressure provided by the flow generator 103, the subsonic flow 1014 is accelerated toward area 1016. When the subsonic flow 1012 reaches area 1016, it results in a sonic flow 1018.

The sonic flow 1018 is accelerated toward the exit area 1024, resulting in flow 1022 near the diverging area 1020, and in flow 1026 at the exit area 1024. Flow 1026 is exhausted into the ambient. Flow 1022 is subjected to a positive streamwise pressure gradient at area 1020. The configuration of the duct 1001, the sonic flow 1018 at area 1016, and the positive streamwise pressure gradient at area 1020 facilitate enhancement of mixing of the fluid stream 1028 downstream from the exit area 1024. Thus, in this embodiment of the present invention, the axial flow in the duct acts as a secondary stream to enhance mixing in the primary stream 1028 of the fluid stream nozzle 1009.

For the mixing enhancement to occur for the system of FIG. 10, the total pressure $p_t$ of flow 1018 must be between two thresholds. The lower threshold is equal to $\alpha*p_a$, where $p_a$ is the ambient static pressure and $\alpha$ is a number greater than 1. The upper threshold is equal to $\beta*p_a$, where $\beta$ is a number greater than $\alpha$. These two thresholds are the same as the ones discussed above for the system of FIG. 1. The discussions relating to FIGS. 3A, 3B, 3C and FIG. 4 also apply to the system of FIG. 10.

Figure 11:
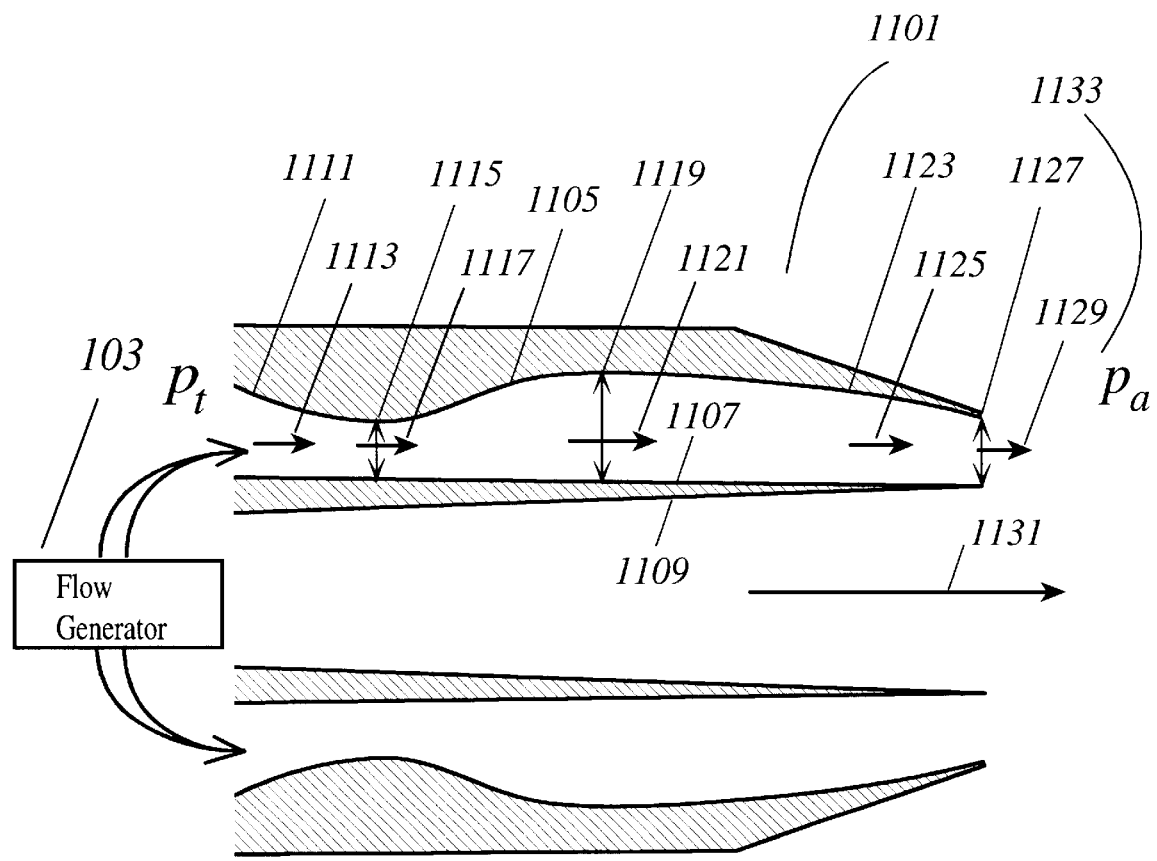
FIG. 11 illustrates a sixth embodiment of the present invention.

FIG. 11 illustrates a sixth embodiment of the present invention. FIG. 11 shows a longitudinal sectional view of a converging-diverging-converging duct 1101. From area 1111 to area 1115, the duct 1101 is converging. From area 1115 to area 1119, the duct 1101 is diverging. From area 1119 to area 1127, the duct 1101 is converging. The fluid stream nozzle 1109 has a fluid stream 1131 flowing through it. The fluid stream 1131 is also called the primary stream.

The duct 1101 comprises an effective outer wall 1105, an effective inner wall 1107, a cross sectional area $A_{min}$ at area 1115, a maximum area $A_{max}$ at area 1119, and an exit area $A_e$ at area 1127. The cross sectional area $A_{min}$ and the exit area $A_e$ are different in size.

As shown in FIG. 11, the converging-diverging-converging feature of the duct 1101 is caused by the shape of the effective outer wall 1105. The effective inner wall 1107 is formed by the outer wall of a fluid stream nozzle 1109. The exit area of the fluid stream nozzle 1109, as illustrated in FIG. 11, is coplanar with the exit area of the duct 1101. It is important to note that the present invention does not require the fluid stream nozzle exit area and the duct exit area to be coplanar. One of them can be upstream from the other. In other words, the fluid stream nozzle 1109 can also extend past the exit area 1127 or recess from the exit area 1127.

Referring to FIG. 11, the flow generator 103 generates a subsonic flow 1113 near the converging area 1111. The flow generator 103 pressurizes the subsonic flow 1113. Due to the configuration of the duct 1101 and the pressure supplied by the flow generator 103, the subsonic flow 1113 is accelerated toward area 1115. When the subsonic flow 1113 reaches area 1115, it results in a sonic flow 1117.

The sonic flow 1117 is accelerated toward the maximum area 1119 which is larger than area 1115, resulting in the supersonic flow 1121 at the diverging area 1119. From area 1115 to area 1119, the flow is supersonic. The supersonic flow 1121 has maximum velocity. The supersonic flow 1121 is decelerated toward the converging area 1123, resulting in flow 1125 at the converging area 1123. Flow 1125 is subjected to a positive streamwise pressure gradient at area 1123. Flow 1125 results in flow 1129 at the exit area 1127. Flow 1129 is exhausted into the ambient 1133. It is noted that the ambient, defined as the fluid medium surrounding the duct 1101, can be either motionless or in motion. An example of an ambient in motion is the ambient surrounding an engine exhaust of an airplane in flight.

The configuration of the duct 1101, the sonic flow 1117 at area 1115, and the positive streamwise pressure gradient in the flow 1125 at area 1123 facilitate enhancement of mixing of the fluid stream 1131 with the flow 1129 and the ambient fluid 1133, downstream from the exit area 1127. Thus, in this sixth embodiment of the present invention, the axial flow in the duct 1101 acts as a secondary stream to enhance mixing in the primary stream 1131 of the fluid stream nozzle 1109.

For the mixing enhancement to occur for the system of FIG. 11, the total pressure $p_t$ of flow 1117, defined as the pressure at which the flow is supplied from a reservoir, must be equal to or greater than a threshold. The reservoir used in the definition can be real or virtual, and included in the flow generator 103. The threshold is equal to the product of the ambient static pressure $p_a$ and a number γ greater than 1. For the system of FIG. 11, mixing enhancement occurs for any $p_t$ value which is equal to or greater than this threshold. Since there is no upper limit on the total pressure $p_t$, the system of FIG. 11 can be used when the pressure ratio $p_t/p_a$ is in the range of moderate to high.

Figure 12:
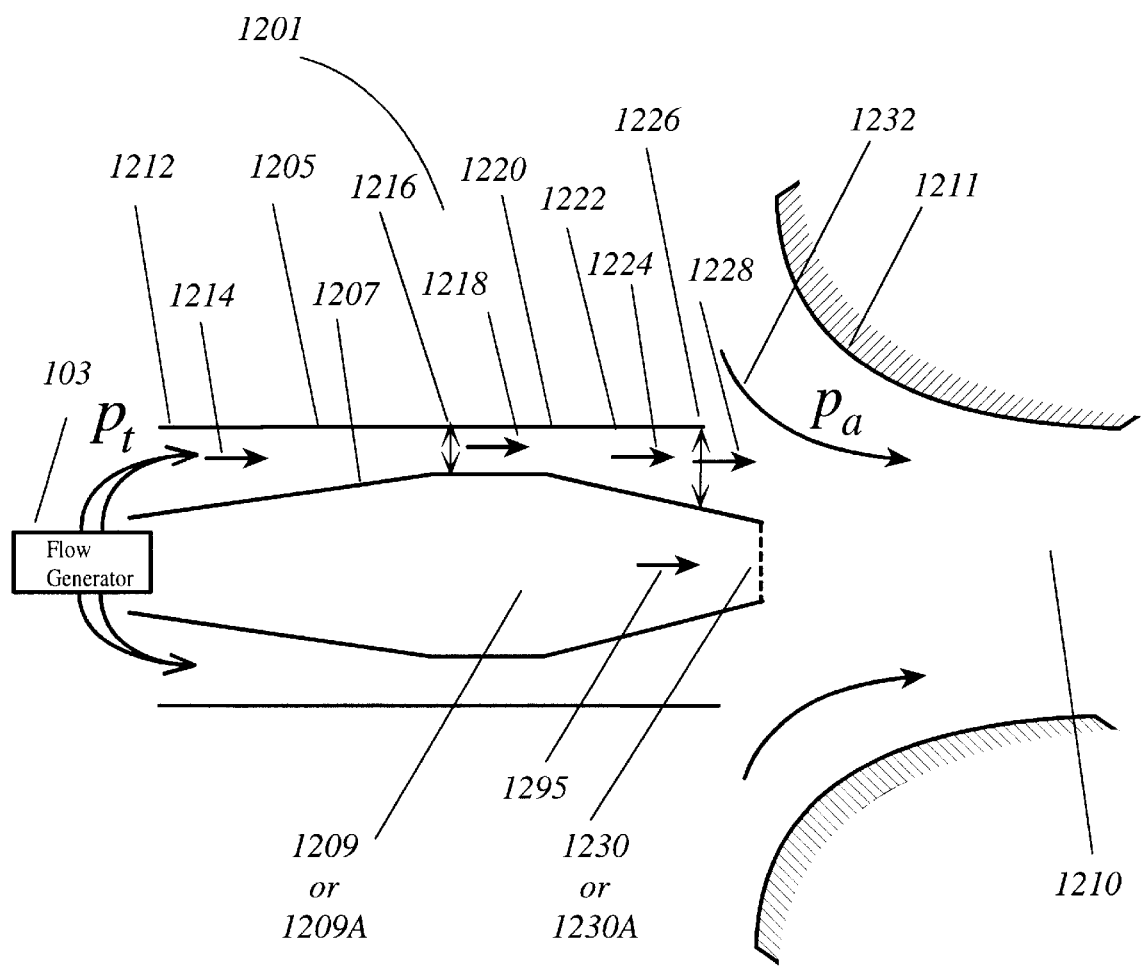
FIG. 12 illustrates a first ejector of the present invention.

FIG. 12 illustrates a first ejector of the present invention. The first ejector of FIG. 12 comprises a duct 1201, a flow generator 103, and an ejector passage 1210 which includes an ejector inlet 1211. The ejector of FIG. 12 also includes either a centerbody 1209 or a nozzle 1209A. If the ejector of FIG. 12 includes the centerbody 1209, then there is no fluid stream flowing through the centerbody 1209, and the centerbody 1209 is terminated at a rigid termination 1230. If the ejector of FIG. 12 includes the nozzle 1209A, then there is a fluid stream 1295 flowing through and exiting the nozzle 1209A at the nozzle exit area 1230A.

Since the underlying principle of operation for the ejector of FIG. 12 is the same whether the ejector includes the centerbody 1209 or the nozzle 1209A, for clarity of description, the ejector of FIG. 12 including the centerbody 1209 will be discussed in detail. The differences between the ejector including the nozzle 1209A and the ejector including the centerbody 1209 will be pointed out.

From area 1212 to area 1216, the duct 1201 is converging. From area 1216 to area 1220, the duct 1201 is shown as constant for illustrative purposes only, it can also be diverging. From area 1220 to area 1226, the duct 1201 is diverging.

Referring to FIG. 12, the duct 1201 comprises an effective outer wall 1205, an effective inner wall 1207, a cross sectional area $A_{min}$ at area 1216, and an exit area $A_e$ at area 1226. The cross sectional area $A_{min}$ is smaller than the exit area $A_e$. The effective inner wall 1207 is formed by the centerbody 1209. Since the centerbody 1209 extends past the exit area 1226, the effective inner wall 1207 is longer than the effective outer wall 1205. The present invention does not require that the centerbody 1209 be extended past the exit area. The endpoint 1230 of the centerbody 1209 can also be coplanar with the duct exit area 1226, or recessed from the termination of the duct effective outer wall 1205 (in which case, the duct exit area would be on the plane normal to the endpoint 1230). The cross-sectional shape of duct 1201 can be either annular or oblong.

Referring to FIG. 12, the flow generator 103 generates a subsonic flow 1214 near the converging area 1212. The flow generator 103 pressurizes the subsonic flow 1214. Due to the configuration of the duct 1201 and the pressure provided by the flow generator 103, the subsonic flow 1214 is accelerated toward area 1216. When the subsonic flow 1214 reaches area 1216, it results in a sonic flow 1218.

The sonic flow 1218 is accelerated toward the exit area 1226, resulting in flow 1224 at the diverging area 1222, and in flow 1228 at the exit area 1226. Flow 1228 is exhausted into the ambient. Flow 1224 is subjected to a positive streamwise pressure gradient at area 1222.

The configuration of the duct 1201, the sonic flow 1218 at area 1216, and the positive streamwise pressure gradient in flow 1224 at area 1222 in proximity of the exit area 1226 facilitate enhancement of mixing of flow 1228 with the ambient fluid 1232 downstream from the exit area 1228. The ambient fluid 1232 is entrained into the ejector passage 1210 via the ejector inlet 1211, due to the action of the duct exhausted flow 1228. The ambient fluid 1232 is also called the induced flow. The exhausted flow 1228 acts as a motive gas for the ejector of FIG. 12 which includes the centerbody 1209. The fluid medium of the sonic flow 1218 can be a gas, a superheated vapor, or a combination thereof.

For the configuration of the ejector of FIG. 12 where the centerbody 1209 is replaced by the nozzle 1209A which has the fluid stream 1295 exiting at the nozzle exit area 1230A, both the duct exhausted flow 1228 and the fluid stream 1295 act as the motive fluids for the ejector. It is important to note that the fluid medium of the fluid stream 1295 can be a liquid, a gas, a saturated liquid and vapor, or a superheated vapor. The ambient fluid 1232 is entrained into the ejector passage 1210 via the ejector inlet 1211, due to the action of both the duct exhausted flow 1228 and the fluid stream 1295. For the exemplary configuration of the ejector, as shown in FIG. 12, the ambient fluid 1232 is mixed with of flow 1228 downstream from the duct exit area 1228, and with both flow 1228 and the fluid stream 1295 downstream from the nozzle exit area 1230A.

For the mixing enhancement to occur for the system of FIG. 12, the total pressure $p_t$ of sonic flow 1218 must be between two thresholds. The lower threshold is equal to $\alpha^*p_a$, where $p_a$ is the ambient static pressure and $\alpha$ is a number greater than 1. The upper threshold is equal to $\beta^*p_a$, where $\beta$ is a number greater than $\alpha$. These two thresholds are the same as the ones discussed above for the system of FIG. 1. The discussions relating to FIGS. 3A, 3B, 3C and FIG. 4 also apply to the system of FIG. 12.

Figure 13:
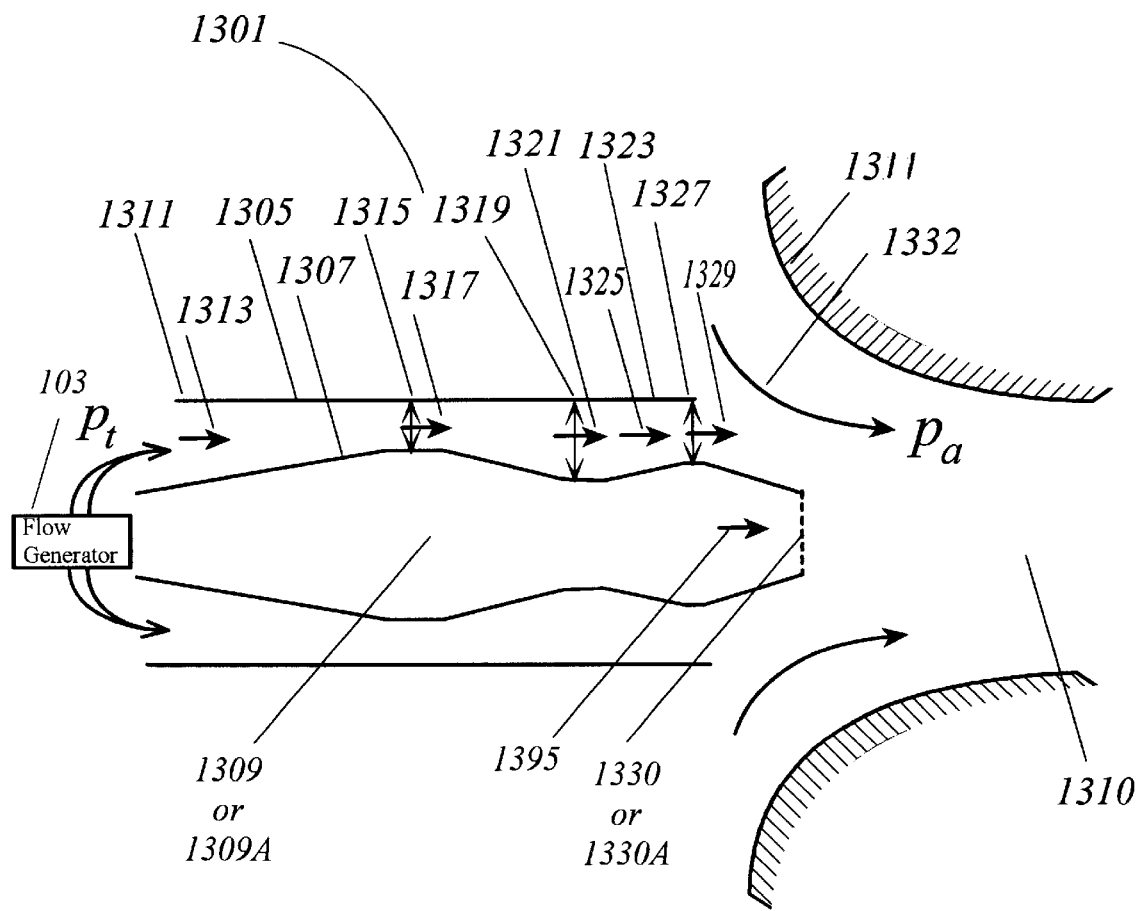
FIG. 13 illustrates a second ejector of the present invention.

FIG. 13 illustrates a second ejector of the present invention. The second ejector of FIG. 13 comprises a duct 1301, a flow generator 103, and an ejector passage 1310 which includes an ejector inlet 1311. The second ejector of FIG. 13 also includes either a centerbody 1309 or a nozzle 1309A. If the ejector of FIG. 12 includes the centerbody 1309, then there is no fluid stream flowing through the centerbody 1309, and the centerbody 1309 is terminated at a rigid termination 1330. If the ejector of FIG. 13 includes the nozzle 1309A, then there is a fluid stream 1395 flowing through and exiting the nozzle 1309A at the nozzle exit area 1330A.

Since the underlying principle of operation for the ejector of FIG. 13 is the same whether the ejector includes the centerbody 1309 or the nozzle 1309A, for clarity of description, the ejector of FIG. 13 including the centerbody 1309 will be discussed in detail. The differences between the ejector including the nozzle 1309A and the ejector including the centerbody 1309 will be pointed out.

FIG. 13 shows a longitudinal sectional view of a converging-diverging-converging duct 1301. From area 1311 to area 1315, the duct 1301 is converging. From area 1315 to area 1319, the duct 1301 is diverging. From area 1319 to area 1327, the duct 1301 is converging.

The duct 1301 comprises an effective outer wall 1305, an effective inner wall 1307, a cross sectional area $A_{min}$ at area 1315, a maximum area $A_{max}$ at area 1319, and an exit area $A_e$ at area 1327. The cross sectional area $A_{min}$ and the exit area $A_e$ are different in size.

As shown in FIG. 13, the converging-diverging-converging feature of the duct 1301 is caused by the shape of the effective inner wall 1307. The effective inner wall 1307 is formed by the outer wall of a centerbody 1309. The centerbody 1309, also called a plug, does not have any fluid flowing though it. Since the centerbody 1309 extends past the exit area 1327, the effective inner wall 1307 is longer the effective outer wall 1305. The present invention does not require that the centerbody 1309 be extended past the exit area. The endpoint 1330 of the centerbody 1309 can also be coplanar with the duct exit area 1327, or recessed from the termination of the duct effective outer wall 1305 (in which case, the duct exit area would be on the plane normal to the endpoint 1330). The cross-sectional shape of duct 1301 can be either annular or oblong.

Referring to FIG. 13, the flow generator 103 generates a subsonic flow 1313 near the converging area 1311. The flow generator 103 pressurizes the subsonic flow 1313. Due to the configuration of the duct 1301 and the pressure supplied by the flow generator 103, the subsonic flow 1313 is accelerated toward area 1315. When the subsonic flow 1313 reaches area 1315, it results in a sonic flow 1317.

The sonic flow 1317 is accelerated toward the maximum area 1319 which is larger than area 1315, resulting in the supersonic flow 1321 at the diverging area 1319. From area 1315 to area 1319, the flow is supersonic. The supersonic flow 1321 has maximum velocity. The supersonic flow 1321 is decelerated toward the converging area 1323, resulting in flow 1325 at the converging area 1323. Flow 1325 is subjected to a positive streamwise pressure gradient at area 1323. Flow 1325 results in flow 1329 at the exit area 1327. Flow 1329 is exhausted into the ambient.

The configuration of the duct 1301, the sonic flow 1317 at area 1315, and the positive streamwise pressure gradient in the flow 1325 at area 1323 in proximity of the exit area 1327 facilitate enhancement of mixing of the duct exhausted flow 1329 with the ambient fluid 1332 downstream from the exit area 1327.

The ambient fluid 1332 is entrained into the ejector passage 1310 via the ejector inlet 1311, due to the action of the duct exhausted flow 1329. The ambient fluid 1332 is also called the induced flow. The exhausted flow 1329 acts as a motive gas for the second ejector of FIG. 13 which includes the centerbody 1309. The fluid medium of the sonic flow 1317 can be a gas, a superheated vapor, or a combination thereof.

For the configuration of the second ejector of FIG. 13 where the centerbody 1309 is replaced by the nozzle 1309A which has the fluid stream 1395 exiting at the nozzle exit area 1330A, both the duct exhausted flow 1329 and the fluid stream 1395 act as the motive fluids for the ejector. It is important to note that the fluid medium of the fluid stream 1395 can be a liquid, a gas, a saturated liquid and vapor, or a superheated vapor. The ambient fluid 1332 is entrained into the ejector passage 1310 via the ejector inlet 1311, due to the action of both the duct exhausted flow 1329 and the fluid stream 1395. For the exemplary configuration of the ejector, as shown in FIG. 13, the ambient fluid 1332 is mixed with of flow 1329 downstream from the duct exit area 1327, and with both flow 1329 and the fluid stream 1395 downstream from the nozzle exit area 1330A.

For the mixing enhancement to occur for the system of FIG. 13, the total pressure $p_t$ of flow 1317, defined as the pressure at which the flow is supplied from a reservoir, must be equal to or greater than a threshold. The reservoir used in the definition can be real or virtual, and included in the flow generator 103. The threshold is equal to the product of the ambient static pressure $p_a$ and a number $\gamma$ greater than 1. For the system of FIG. 13, mixing enhancement occurs for any $p_t$ value which is equal to or greater than this threshold. Since there is no upper limit on the total pressure $p_t$, the system of FIG. 13 can be used when the pressure ratio $p_t/p_a$ is in the range of moderate to high.

Figure 14:
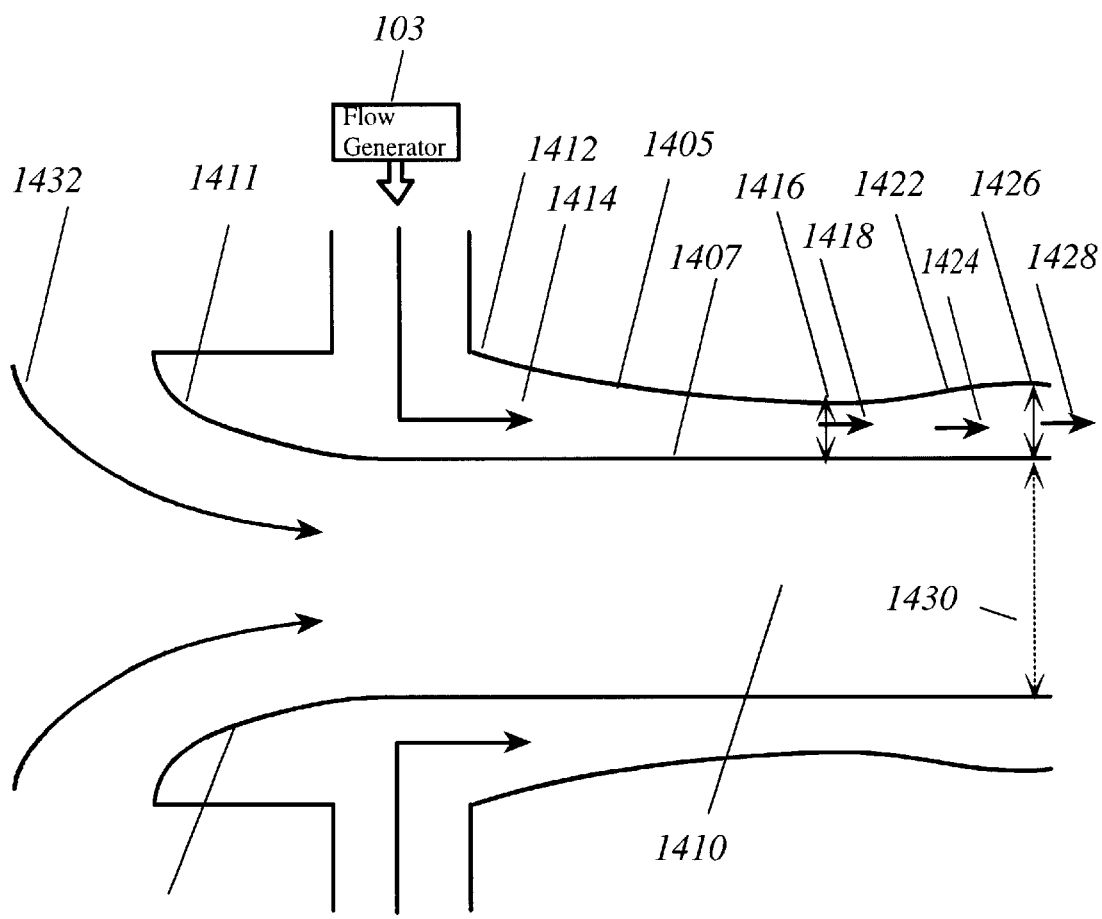
FIG. 14 is an inverted ejector which includes the embodiment of FIG. 1 of the present invention.

FIG. 14 is an inverted ejector which includes the embodiment of FIG. 1 of the present invention. The inverted ejector of FIG. 14 comprises a duct 1401, a flow generator 103, and an ejector passage 1410 which includes an ejector inlet 1411. The ejector passage 1410 has a passage exit area 1430.

From area 1412 to area 1416, the duct 1401 is converging. From area 1416 to 1426, the duct 1401 is diverging.

Referring to FIG. 14, the duct 1401 comprises an effective outer wall 1405, an effective inner wall 1407, a cross sectional area $A_{min}$ at area 1416, and an exit area $A_e$ at area 1426. The cross sectional area $A_{min}$ is smaller than the exit area $A_e$. The effective inner wall 1407 is formed by the ejector passage 1410. The cross-sectional shape of duct 1401 can be either annular or oblong.

Referring to FIG. 14, the flow generator 103 generates a subsonic flow 1414 near the converging area 1412. The flow generator 103 pressurizes the subsonic flow 1414. Due to the configuration of the duct 1401 and the pressure provided by the flow generator 103, the subsonic flow 1414 is accelerated toward area 1416. When the subsonic flow 1414 reaches area 1416, it results in a sonic flow 1418.

The sonic flow 1418 is accelerated toward the exit area 1426, resulting in flow 1424 at the diverging area 1422, and in flow 1428 at the exit area 1426. Flow 1428 is exhausted into the ambient. Flow 1424 is subjected to a positive streamwise pressure gradient at area 1422.

The configuration of the duct 1401, the sonic flow 1418 at area 1416, and the positive streamwise pressure gradient in flow 1424 at area 1422 in proximity of the exit area 1426 facilitate enhancement of mixing of flow 1428 with the ambient fluid 1432 downstream from the exit area 1428. The ambient fluid 1432 is entrained into the ejector passage 1410 via the ejector inlet 1411, due to the action of the duct exhausted flow 1428. The ambient fluid 1432 is also called the induced flow. The exhausted flow 1428 acts as a motive gas for the ejector of FIG. 14.

The fluid medium of the sonic flow 1418 can be a gas, a superheated vapor, or a combination thereof.

For the mixing enhancement to occur for the system of FIG. 14, the total pressure $p_t$ of sonic flow 1418 must be between two thresholds. The lower threshold is equal to $\alpha*p_a$, where $p_a$ is the ambient static pressure and $\alpha$ is a number greater than 1. The upper threshold is equal to $\beta*p_a$, where $\beta$ is a number greater than $\alpha$. These two thresholds are as discussed above for the system of FIG. 1. The discussions relating to FIGS. 3A, 3B, 3C and FIG. 4 also apply to the system of FIG. 14.

Figure 15:
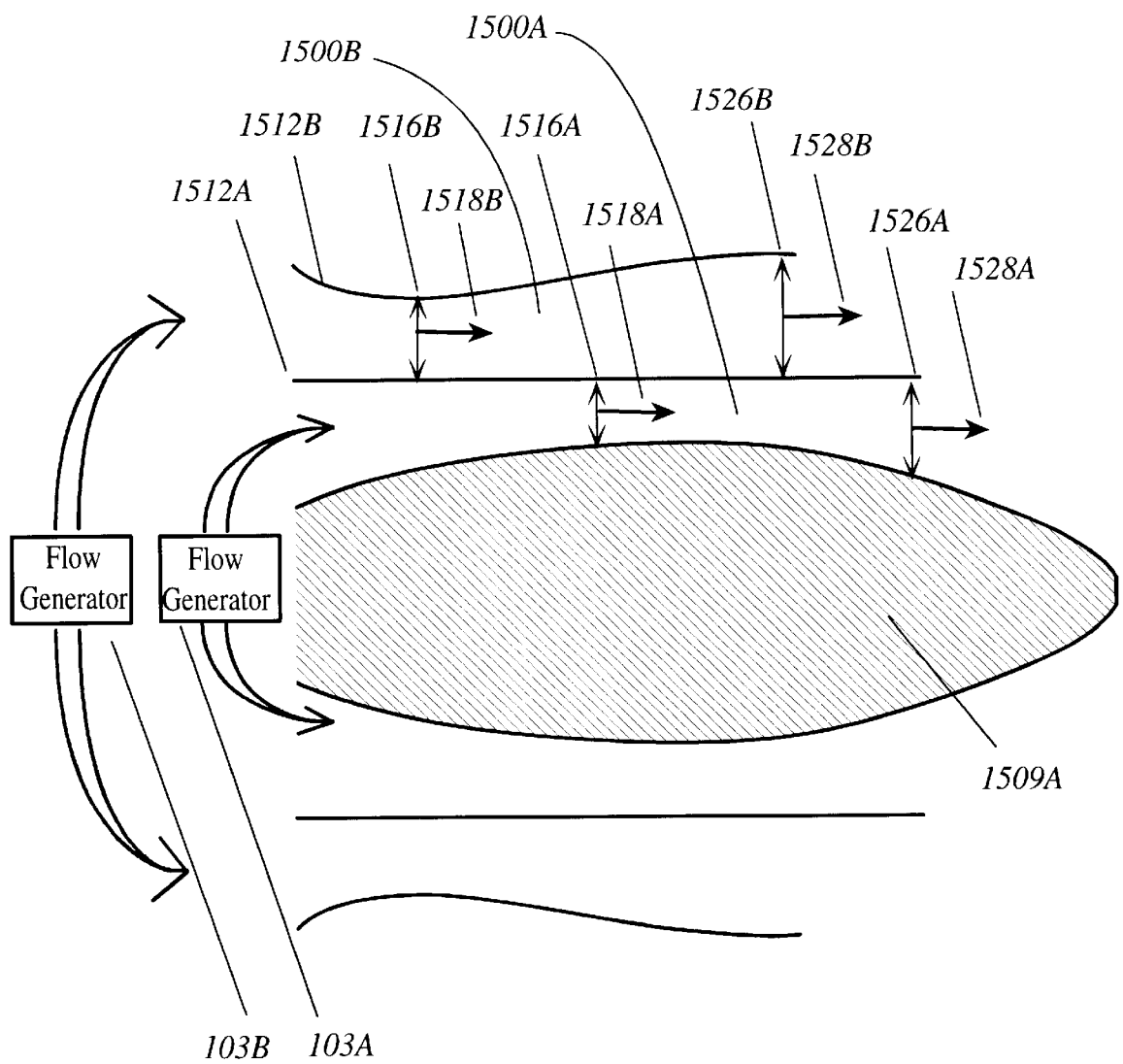
FIG. 15 is a system which includes the embodiment of FIG. 1 of the present invention.

FIG. 15 is a system which includes the embodiment of FIG. 1 of the present invention. Such a system can be used to enhance mixing in the exhaust of a turbofan engine. The system of FIG. 15 is not limited to this turbofan engine application. Also, other configurations employing at least one of the embodiments of the present invention can also in used in a turbofan engine application.

The system of FIG. 5 comprises a centerbody 1509, an inner duct 1500A and an outer duct 1500B. The system also includes two flow generators 103A and 103B. The configuration and operation of the inner duct 1500A is the same as the ones for the converging-diverging duct 101 of FIG. 1. The configuration and operation of the outer duct 1500B is also the same as the one for the converging-diverging duct 101 of FIG. 1.

From area 1512A to area 1516A, the duct 1500A is converging. From area 1516A to 1526A, the duct 1500A is diverging.

From area 1512B to area 1516B, the duct 1500B is converging. From area 1516B to 1526B, the duct 1500B is diverging.

Referring to FIG. 15, the duct 1500A comprises an effective outer wall 1505A, an effective inner wall 1507A, a cross sectional area $A_{min,A}$ at area 1516A, and an exit area $A_{e,A}$ at area 1526A. The cross sectional area $A_{min,A}$ is smaller than the exit area $A_{e,A}$. The effective inner wall 1507A is formed by the centerbody 1509.

Referring to FIG. 15, the duct 1500B comprises an effective outer wall 1505B, an effective inner wall 1507B, a cross sectional area $A_{min,B}$ at area 1516B, and an exit area $A_{e,B}$ at area 1526B. The cross sectional area $A_{min,B}$ is smaller than the exit area $A_{e,B}$. The effective inner wall 1507B is formed by the centerbody 1509.

The discussion relating to the duct 101 of FIG. 1 also applies to the inner and outer ducts 1500A and 1500B of FIG. 15.

Flow generator 103A generates a flow 1514A for the duct 1500A. Flow generator 103B generates a flow 1514B for the duct 1500B.

The sonic flow 1518A is accelerated toward the exit area 1526A, resulting in flow 1524A at the diverging area 1522A, and in flow 1528A at the exit area 1526A. Flow 1528A is exhausted into the ambient. Flow 1524A is subjected to a positive streamwise pressure gradient at area 1522A. The configuration of the duct 1500A, the sonic flow 1518A at area 1516A, and the positive streamwise pressure gradient at area 1522A facilitate enhancement of fluid mixing downstream from the exit area 1528A.

The sonic flow 1518B is accelerated toward the exit area 1526B, resulting in flow 1524B at the diverging area 1522B, and in flow 1528B at the exit area 1526B. Flow 1528B is exhausted into the ambient. Flow 1524B is subjected to a positive streamwise pressure gradient at area 1522B. The configuration of the duct 1500B, the sonic flow 1518B at area 1516B, and the positive streamwise pressure gradient at area 1522B facilitate enhancement of fluid mixing downstream from the exit area 1528B.

For the mixing enhancement to occur for the duct 1500A of the system of FIG. 15, the total pressure $p_t$ of sonic flow 1518A must be between two thresholds. The lower threshold is equal to $\alpha_A*p_a$, where $p_a$ is the ambient static pressure and $\alpha_A$ is a number greater than 1. The upper threshold is equal to $\beta_A*p_a$, where $\beta_A$ is a number greater than $\alpha_A$. These two thresholds are as discussed above for the system of FIG. 1. The discussions relating to FIGS. 3A, 3B, 3C and FIG. 4 also apply to the duct 1500A of the system of FIG. 15.

For the mixing enhancement to occur for the duct 1500B of the system of FIG. 15, the total pressure $p_t$ of sonic flow 1518B must be between two thresholds. The lower threshold is equal to $\alpha_B*p_a$, where $p_a$ is the ambient static pressure and $\alpha_B$ is a number greater than 1. The upper threshold is equal to $\beta_B*p_a$, where $\beta_B$ is a number greater than $\alpha_B$. These two thresholds are as discussed above for the system of FIG. 1. The discussions relating to FIGS. 3A, 3B, 3C and FIG. 4 also apply to the duct 1500B of the system of FIG. 15.

Figure 16A:
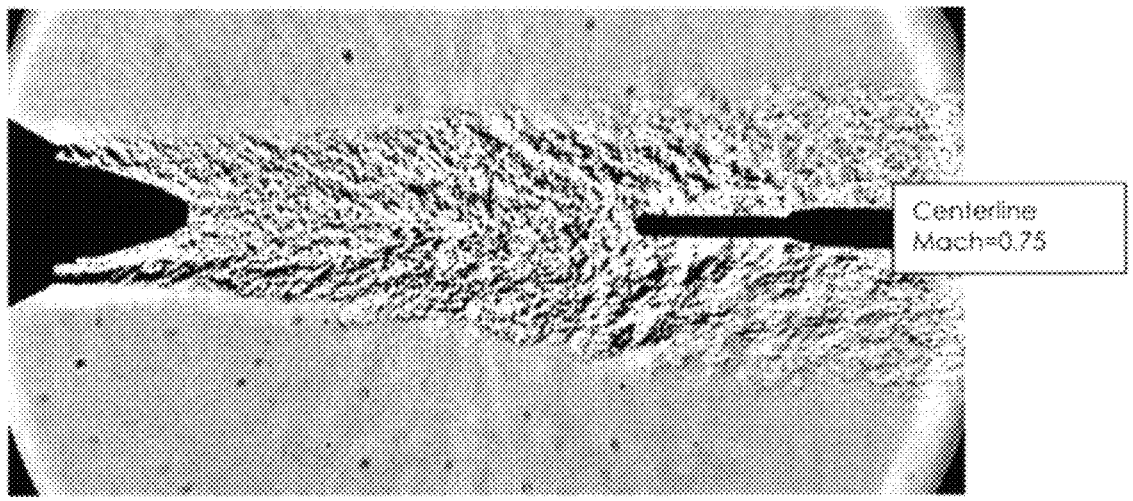
FIGS. 16A and 16B present experimental results on the system illustrated by FIG. 8.
Figure 16B:
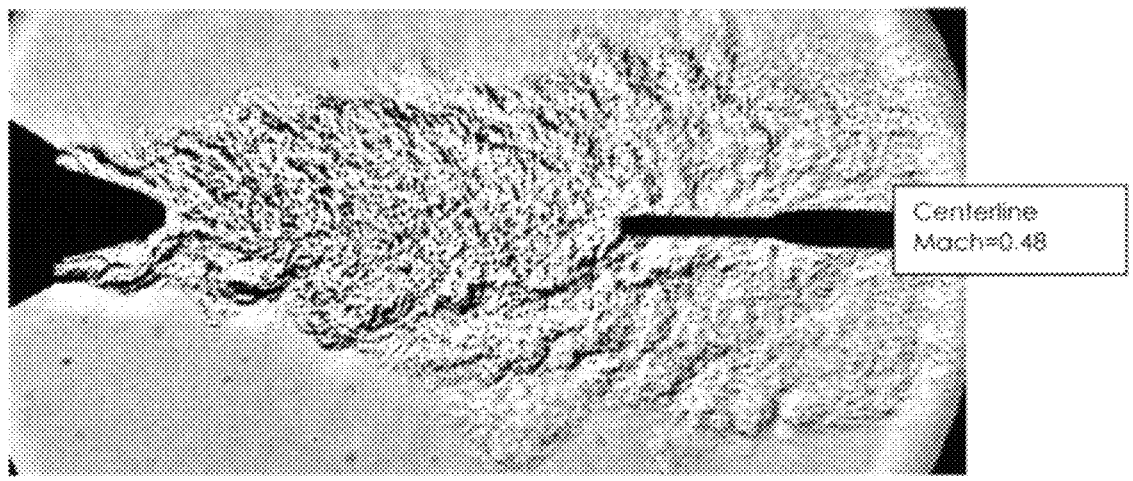

FIGS. 16A and 16B present experimental results on the system illustrated by FIG. 8. Diagnostic techniques comprised schlieren photography and measurements of the centerline Mach number using a pitot probe. The flows in FIGS. 16A and 16B have the same nozzle pressure ratio (1.8), same ideally-expanded Mach number (0.9), same velocity (410 m/s), and same mass flow rate. In FIG. 16A, the duct formed by the plug and outer surface of the nozzle is converging, hence the pressure gradient in the proximity of the exit is negative. The mixing of the jet with the ambient is modest. In FIG. 16B, the duct formed by the plug and outer surface of the nozzle is converging-diverging, hence the pressure gradient in the proximity of the exit is positive. Mixing of the jet with the ambient is increased substantially, consistent with the method described in this patent. The mixing enhancement is quantified further by the reduction in centerline Mach number from 0.75 in FIG. 16A to 0.48 in FIG. 16B.

Figure 17A:
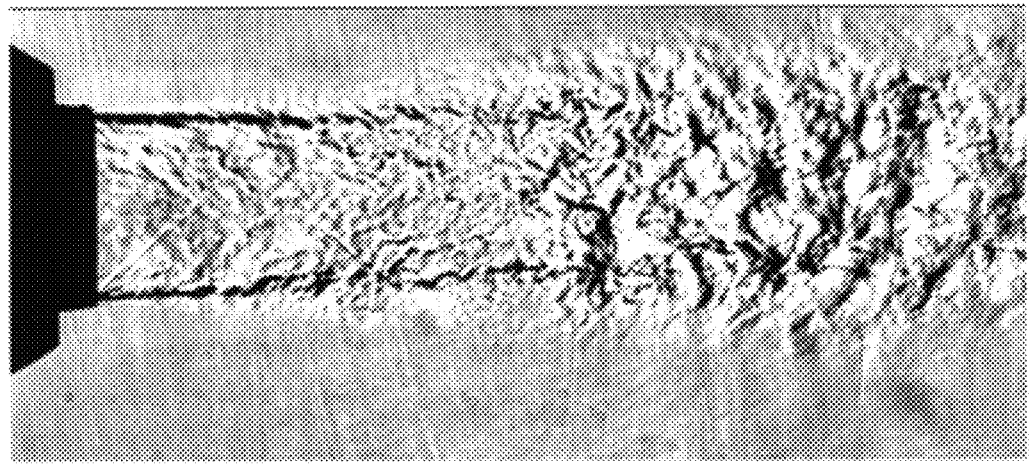
FIGS. 17A and 17B present experimental schlieren images of the system illustrated by FIG. 10.
Figure 17B:
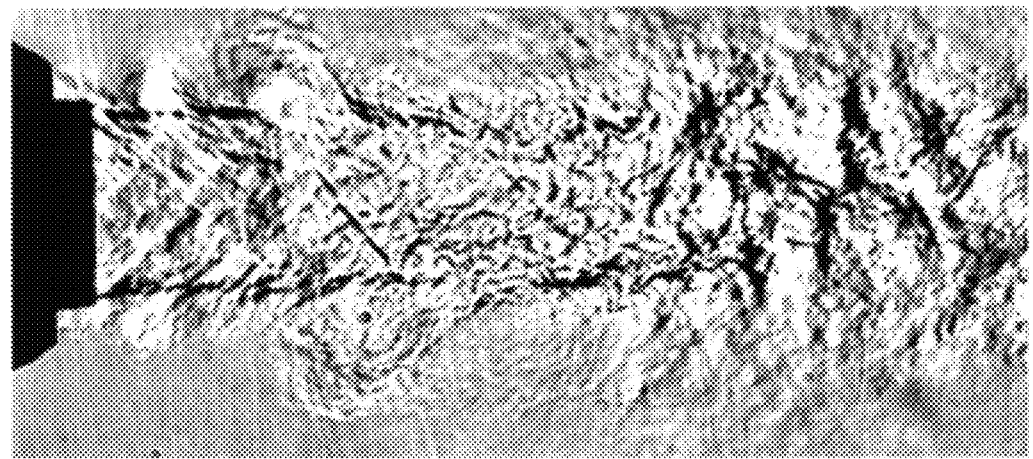

FIGS. 17A and 17B present experimental schlieren images of the system illustrated by FIG. 10. The fluid stream consisted of air issuing from a supersonic nozzle at Mach number 1.5 and velocity of 430 m/s. FIG. 17A depicts the single stream, without coflow, which mixes very slowly with the surrounding air. FIG. 17B depicts the same stream of FIG. 17A now surrounded by an annular coflow with pressure ratio 1.8, issuing from a converging-diverging annular duct. In FIG. 17B, the mixing of the supersonic stream with the coflow and with the ambient air is increased substantially, consistent with the method described in this patent.

Figure 18:
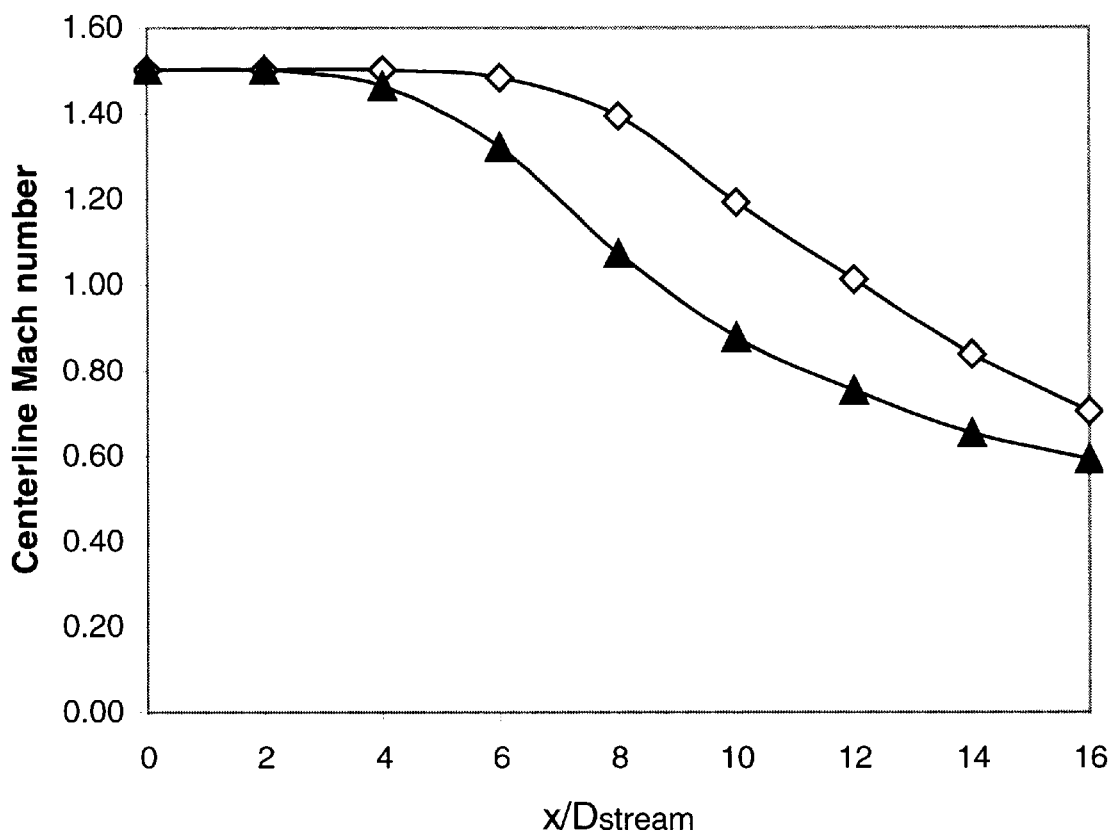
FIG. 18 is a graph of centerline Mach number as a function of axial distance for the flows of FIGS. 17A and 17B.

FIG. 18 is a graph of centerline Mach number as a function of axial distance x which is normalized by the exit diameter $D_{stream}$ of the fluid stream nozzle. Open symbols represent the flow of FIG. 17A and solid symbols represent the flow of FIG. 17B. At a given axial location, reduction of the centerline Mach number indicates mixing enhancement. Starting at $x/D_{stream}=3$, the centerline Mach numbers corresponding to the flow of FIG. 17B are considerably lower that those of the flow FIG. 17A. This is further evidence of the mixing enhancement achieved using the methods of this patent.

Mixing enhancement is desirable for a large number of applications. The following are some of the applications of the system of the present invention.

The duct of FIG. 8 can be used as the exhaust of a turbojet engine. The effective inner wall of the duct is formed by the outer shell of a turbine exhaust and the effective inner wall is formed by a plug nozzle of the turbine exhaust.

The duct of FIG. 9 can be used as the exhaust of a turbojet engine. The effective inner wall of the duct is formed by the outer shell of a turbine exhaust and the effective inner wall is formed by a plug nozzle of the turbine exhaust.

The duct of FIG. 8 can be used as the exhaust of a turboprop engine. The effective inner wall of the duct is formed by the outer shell of a turbine exhaust and the effective inner wall is formed by a plug nozzle of the turbine exhaust.

The duct of FIG. 8 can be used as the exhaust of a turboshaft engine. The effective inner wall of the duct is formed by the outer shell of a turbine exhaust and the effective inner wall is formed by a plug nozzle of the turbine exhaust.

Duct 1001 of FIG. 10 can be used as a compressor bleed exhaust of a turbojet engine, where a portion of the compressor air is used to enhance mixing in the exhaust.

Duct 1001 of FIG. 10 can be used as a compressor bleed exhaust of a turboprop engine, where a portion of the compressor air is used to enhance mixing in the exhaust.

Duct 1001 of FIG. 10 can be used as a compressor bleed exhaust of a turboshaft engine, where a portion of the compressor air is used to enhance mixing in the exhaust.

Duct 1001 of FIG. 10 can be used as the fan exhaust of a separated-flow turbofan engine.

The duct of FIG. 8 can be used as the core exhaust of a separated-flow turbofan engine. The effective inner wall of the duct is formed by the outer shell of a core and the effective inner wall is formed by a plug nozzle of the core.

The duct of FIG. 8 can be used as the mixed-flow exhaust of a mixed-flow turbofan engine, where the effective outer wall of the duct is formed by the outer shell of the mixed-flow nozzle and the effective inner wall is formed by the plug nozzle of the mixed-flow exhaust.

Duct 1001 of FIG. 10 can be used as a compressor bleed exhaust of a mixed-flow turbofan engine, where a portion of the compressor air is used to enhance mixing in the mixed-flow exhaust.

Duct 1001 of FIG. 10 can be used as a partial fan exhaust of a mixed-flow turbofan engine, where a portion of the fan air is used to enhance mixing in the mixed-flow exhaust.

The duct of FIG. 9 can be used as the exhaust of the core stream of a separated-flow turbofan engine.

The duct of FIG. 9 can be used as the mixed-flow exhaust of a mixed-flow turbofan engine.

Duct 1101 of FIG. 11 can be used as the fan exhaust of a separated-flow turbofan engine.

Duct 1101 of FIG. 11 can be used as a partial fan exhaust of a mixed-flow turbofan engine.

Duct 1101 of FIG. 11 can be used as a compressor bleed exhaust of a turbine engine.

The system of FIG. 15 can be used as the exhaust of a separated-flow turbofan engine.

The system of FIG. 12 can be used as an ejector of a jet engine to increase pumping efficiency of the ejector.

The system of FIG. 13 can be used as an ejector of a jet engine to increase pumping efficiency of the ejector.

The system of FIG. 12 can be used as an ejector of a fluid pump.

The system of FIG. 13 can be used as an ejector of a fluid pump.

The system of FIG. 14 can be used as an ejector of a fluid pump.

The duct of FIG. 8 can be used as a fuel injector of a reciprocating engine.

The duct of FIG. 9 can be used as a fuel injector of a reciprocating engine.

The system of FIG. 10 can be used as a fuel injector of a reciprocating engine and the sonic flow in the duct is the oxidizer.

The system of FIG. 10 can be used as a fuel injector of a reciprocating engine and the fluid medium of the sonic flow in the duct is fuel.

The system of FIG. 10 can be used as a fuel injector of a turbine engine and the fluid medium of the sonic flow in the duct is air.

The system of FIG. 10 can be used as a fuel injector of a turbine engine and the fluid medium of the sonic flow in the duct is fuel.

The duct of FIG. 8 can be used as a fuel injector of a ramjet engine.

The duct of FIG. 9 can be used as a fuel injector of a ramjet engine.

The system of FIG. 10 can be used as a fuel injector of a ramjet engine.

The system of FIG. 11 can be used as a fuel injector of a ramjet engine.

The duct of FIG. 8 can be used as a fuel injector of a supersonic combustion ramjet engine.

The duct of FIG. 9 can be used as a fuel injector of a supersonic combustion ramjet engine.

The system of FIG. 10 can be used as a fuel injector of a supersonic combustion ramjet engine.

The system of FIG. 11 can be used as a fuel injector of a supersonic combustion ramjet engine.

The duct of FIG. 8 can be used as a fuel injector of a furnace.

The system of FIG. 10 can be used as a fuel injector of a furnace.

The duct of FIG. 8 can be used as a fuel injector of an incinerator.

The duct of FIG. 8 can be used as a fuel injector of an industrial burner.

The duct of FIG. 8 can be used as a fuel injector in a rocket engine.

The system of FIG. 10 can be used as a fuel injector in a main burner of a rocket engine where the fluid medium of the sonic flow comprises gaseous fuel.

The system of FIG. 10 can be used as a fuel injector in a pre-burner of a rocket engine where the fluid medium of the sonic flow comprises gaseous fuel.

The duct of FIG. 8 can be used as an injector of gas into the laser cavity of a chemical laser.

The duct of FIG. 9 can be used as an injector of gas into the laser cavity of a chemical laser.

The duct of FIG. 10 can be used as an injector of gas into the laser cavity of a chemical laser.

The duct of FIG. 11 can be used as an injector of one or more chemical gases into the laser cavity of a chemical laser.

The system of FIG. 10 can be used as a spray injector.

The system of FIG. 11 can be used as a spray injector.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. A method for enhancing fluid mixing, the method comprising the operations of:
   (a) configuring a duct to have an effective outer wall, an effective inner wall, a cross-sectional shape, a first cross-sectional area and an exit area, the first cross-sectional area and the exit area being different in size; and
   (b) generating a first flow region at the first cross-sectional area between the effective outer and inner walls, by a flow generator, the first flow region having a total pressure and a speed equal to or greater than a local speed of sound, the first flow region resulting in a second flow region subjected to a positive streamwise pressure gradient in proximity of the exit area, the second flow region being mixed with at least an adjacent fluid; wherein configuring the duct comprises configuring the duct to have an annular or oblong cross-sectional shape.

2. The method of claim 1 further comprising the operation of disposing a centerbody inside the duct such that the effective inner wall is formed by the centerbody.

3. The method of claim 1 wherein a portion of the effective outer wall is formed by a transversal flow.

4. The method of claim 1 wherein a portion of the effective inner wall is formed by a transversal flow.

5. The method of claim 1 wherein configuring the duct comprises configuring the duct such that at least one of the effective inner and outer walls is rigid.

6. The method of claim 1 further comprising the operation of disposing a fluid stream nozzle, having a nozzle outer wall, inside the duct such that the effective inner wall is formed by the nozzle outer wall.

7. The method of claim 1 further comprising the operation of disposing a fluid stream, having a fluid boundary, inside the duct such that the effective inner wall is formed by the fluid boundary.

8. The method of claim 1 further comprising the operation of disposing a fluid stream nozzle, having a nozzle outer wall, adjacent to the duct such that the effective inner wall is formed by the nozzle outer wall.

9. The method of claim 1 further comprising the operation of disposing a fluid stream, having a fluid boundary, adjacent to the duct such that the effective inner wall is formed by the fluid boundary.

10. The method of claim 1 wherein configuring the duct comprises configuring the duct such that the first cross-sectional area is smaller than the exit area, and the speed of the first flow region is equal to the local speed of sound.

11. The method of claim 10 wherein generating the first flow region comprises generating the first flow region such that the total pressure of the first flow region is between a first threshold and a second threshold, the first threshold being equal to a product of an ambient static pressure and a first number, the second threshold being equal to a product of the ambient static pressure and a second number, the first and second numbers being greater than 1.

12. The method of claim 10 wherein operation (b) comprises the operation of accelerating a third flow region having a subsonic speed at a second cross-sectional area located upstream from the first cross-sectional area, the second cross-sectional area being larger than the first cross-sectional area, the first flow region resulting from the third flow region.

13. The method of claim 1 wherein the first flow region comprises one selected from the group of a gas, a superheated vapor and a combination of a gas and a superheated vapor.

14. The method of claim 1 wherein configuring the duct comprises configuring the duct such that the first cross-sectional area is larger than the exit area, and the speed of the first flow region is greater than the local speed of sound.

15. The method of claim 14 wherein generating the first flow region comprises generating the first flow region such that the total pressure of the first flow region is greater than a third threshold, the third threshold being equal to a product of an ambient static pressure and a third number, the third number being greater than 1.

16. The method of claim 14 wherein operation (b) comprises the operations of:
   accelerating a third flow region having a subsonic speed at a second cross-sectional area located upstream from the first cross-sectional area; and
   accelerating a fourth flow region having a sonic speed at a third cross-sectional area located between the first cross-sectional area and the second cross-sectional area, the third cross-sectional area being smaller than the first and second cross-sectional areas, the fourth flow resulting from the third flow region, the first flow region resulting from the fourth flow region.

17. A system for enhancing fluid mixing, the system comprising:
   (a) a duct, the duct having an effective outer wall, an effective inner wall, a cross-sectional shape, a first cross-sectional area and an exit area, the first cross-sectional area and the exit area being different in size; and
   (b) a flow generator coupled to the duct, the flow generator generating a first flow region at the first cross-sectional area between the effective outer and inner walls, the first flow region having a total pressure and a speed equal to or greater than a local speed of sound, the first flow region resulting in a second flow region subjected to a positive streamwise pressure gradient in proximity of the exit area, the second flow region being mixed with at least an adjacent fluid; wherein the cross-sectional shape of the duct is annular or oblong.

18. The system of claim 17 wherein the effective inner wall is formed by a centerbody.

19. The system of claim 17 wherein a portion of the effective outer wall is formed by a transversal flow.

20. The system of claim 17 wherein a portion of the effective inner wall is formed by a transversal flow.

21. The system of claim 17 wherein at least one of the effective inner and outer walls is rigid.

22. The system of claim 17 the effective inner wall is formed by an outer wall of a jet nozzle.

23. The system of claim 17 wherein the effective inner wall is formed by a boundary of a jet.

24. The system of claim 17 wherein the first cross-sectional area is smaller than the exit area, and the speed of the first flow region is equal to the local speed of sound.

25. The system of claim 24 wherein the total pressure of the first flow region is between a first threshold and a second threshold, the first threshold being equal to a product of an ambient static pressure and a first number, the second threshold being equal to a product of the ambient static pressure and a second number, the first and second numbers being greater than 1.

26. The system of claim 24 wherein the flow generator accelerates a third flow region having a subsonic speed at a second cross-sectional area located upstream from the first cross-sectional area, the second cross-sectional area being larger than the first cross-sectional area.

27. The system of claim 17 wherein the first cross-sectional area is larger than the exit area, and the speed of the first flow region is greater than the local speed of sound.

28. The system of claim 27 wherein the total pressure of the first flow region is greater than a third threshold, the third threshold being equal to a product of an ambient static pressure and a third number, the third number being greater than 1.

29. The system of claim 27 wherein the flow generator accelerates a third flow region having a subsonic speed at a second cross-sectional area located upstream from the first cross-sectional area, and accelerates a fourth flow region having a sonic speed at a third cross-sectional area located between the first cross-sectional area and the second cross-sectional area, the third cross-sectional area being smaller than the first and second cross-sectional areas, the fourth flow region resulting from the third flow region, the first flow region resulting from the fourth flow region.

30. The system of claim 17 wherein the duct is an exhaust of a fan of a separated-flow turbofan engine.

31. The system of claim 17 wherein the duct is an exhaust of a core of a separated-flow turbofan engine, the effective outer wall being formed by an outer shell of the core and the effective inner wall being formed by a plug nozzle of the core.

\* \* \* \* \*